US006581458B1

(12) United States Patent
Hathaway et al.

(10) Patent No.: US 6,581,458 B1
(45) Date of Patent: Jun. 24, 2003

(54) PRECALIBRATED FLOW METER WITH AIRFLOW COMPENSATOR

(75) Inventors: John E. Hathaway, Fort Wayne, IN (US); Stephen R. Lund, Cary, NC (US); Robert N. Mansur, Cary, NC (US); Kraig J. Schlosser, Columbia City, IN (US); John D. Buskirk, Bluffton, IN (US)

(73) Assignee: Tuthill Corporation, Hinsdale, IL (US)

( * ) Notice: Subject to any disclaimer, the term of this patent is extended or adjusted under 35 U.S.C. 154(b) by 0 days.

(21) Appl. No.: 09/883,881

(22) Filed: Jun. 18, 2001

Related U.S. Application Data

(63) Continuation-in-part of application No. 09/126,453, filed on Jul. 30, 1998.
(60) Provisional application No. 60/057,034, filed on Aug. 7, 1997.

(51) Int. Cl.$^7$ ................................................ G01F 3/32
(52) U.S. Cl. ........................................ 73/238; 73/861
(58) Field of Search .............................. 73/231, 861.77, 73/861.04, 230, 721, 180, 708, 861.35, 861, 232–238

(56) References Cited

U.S. PATENT DOCUMENTS

| | | | |
|---|---|---|---|
| 1,778,716 A | 10/1930 | Foregger | |
| 2,099,842 A | 11/1937 | Connell | |
| 2,851,882 A | 9/1958 | Nottingham, Jr. | |
| 3,233,457 A | 2/1966 | Martinez | |
| 3,581,576 A | * 6/1971 | Reiser | 73/459 |
| 3,831,011 A | 8/1974 | Hulme | |
| 4,182,188 A | 1/1980 | Briton et al. | |
| 4,331,262 A | 5/1982 | Snyder et al. | |
| 4,581,945 A | 4/1986 | Rusz | |
| 4,848,164 A | * 7/1989 | Quarve et al. | 73/861.77 |
| 4,864,869 A | 9/1989 | Glasheen | |
| 4,885,943 A | * 12/1989 | Tootell et al. | 73/861.77 |
| 5,195,873 A | 3/1993 | Claussen et al. | |
| 5,251,149 A | 10/1993 | Williams et al. | |
| 5,456,107 A | 10/1995 | Padden et al. | |
| 5,597,961 A | 1/1997 | Marrelli | |
| 5,780,735 A | 7/1998 | Kadohiro et al. | |
| 5,866,824 A | * 2/1999 | Schieber | 73/861.79 |

* cited by examiner

Primary Examiner—Hezron Williams
Assistant Examiner—Alandra N. Ellington
(74) Attorney, Agent, or Firm—Barnes & Thornburg

(57) ABSTRACT

An air flow compensator for use with flow meters which includes a main slide element, a secondary slide element and first and second spring elements. The main slide element includes a magnetic insert in one end thereof and is movable toward a proximity sensor that detects the proximity of the magnetic insert. The first spring element biases both the main slide element and the secondary slide element away from the proximity sensor and the second spring element biases only the secondary slide element away from the proximity sensor. The secondary slide element is both movable together with the first slide element and independently movable with respect to the main slide element.

17 Claims, 35 Drawing Sheets

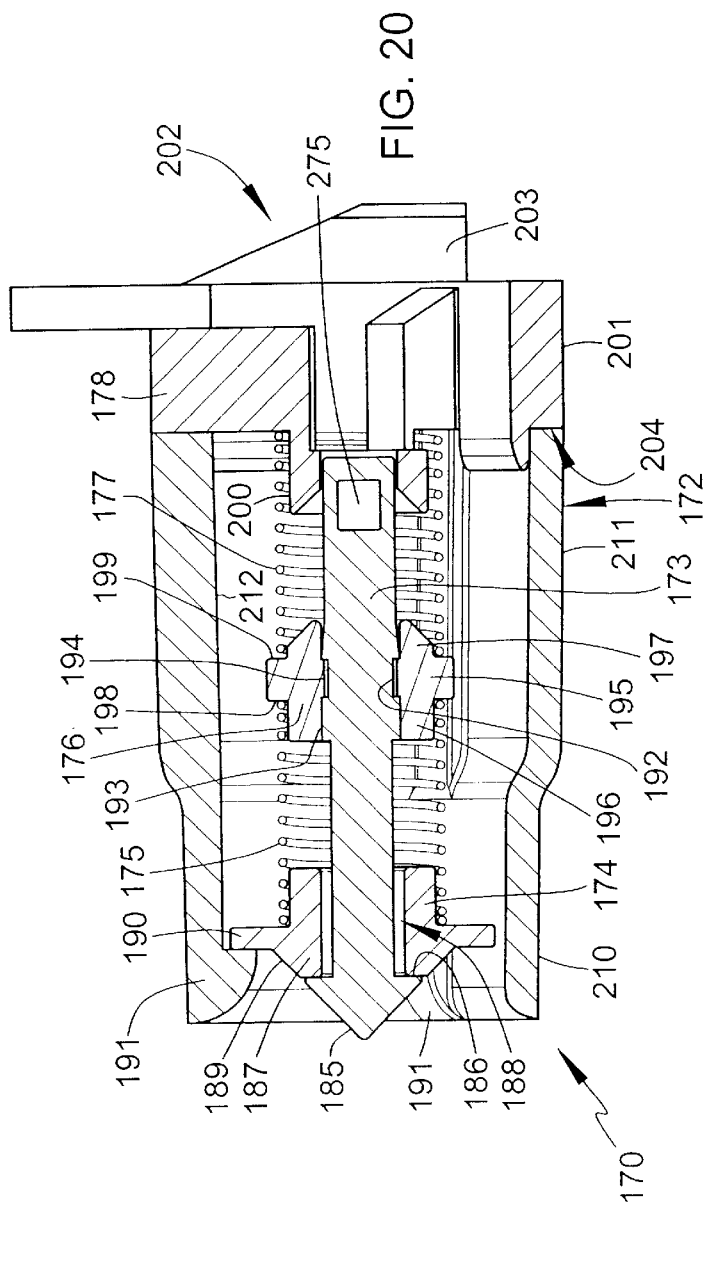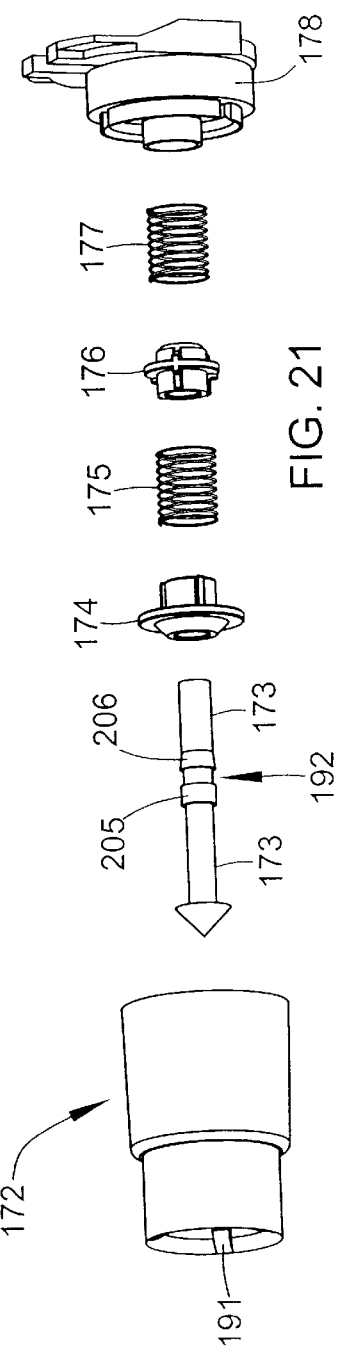

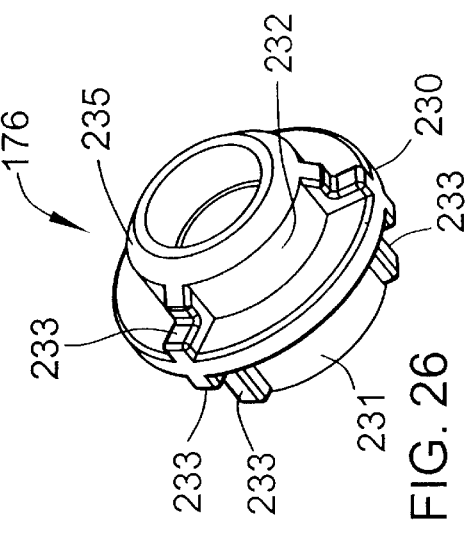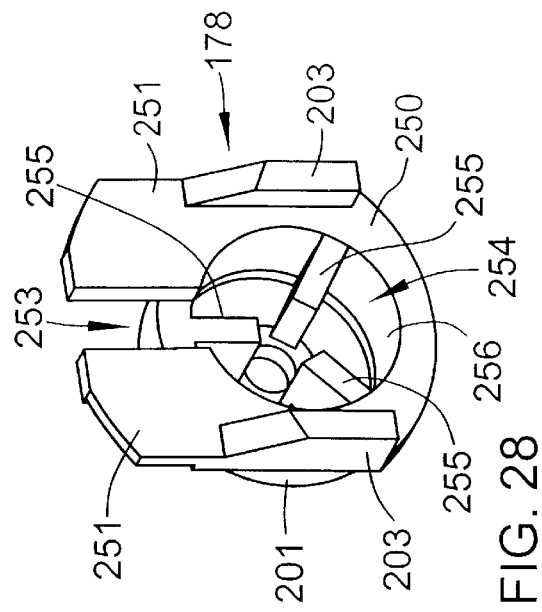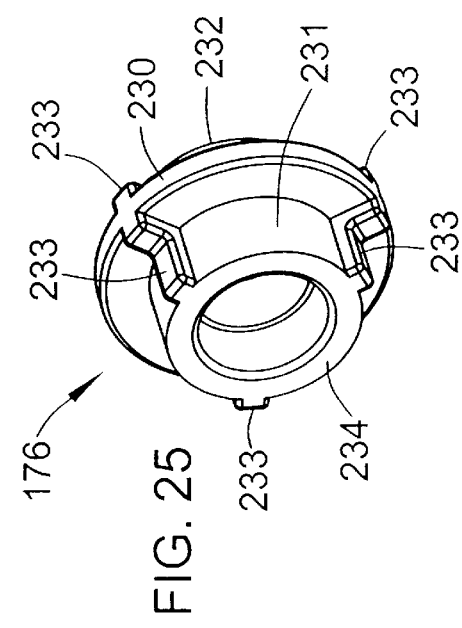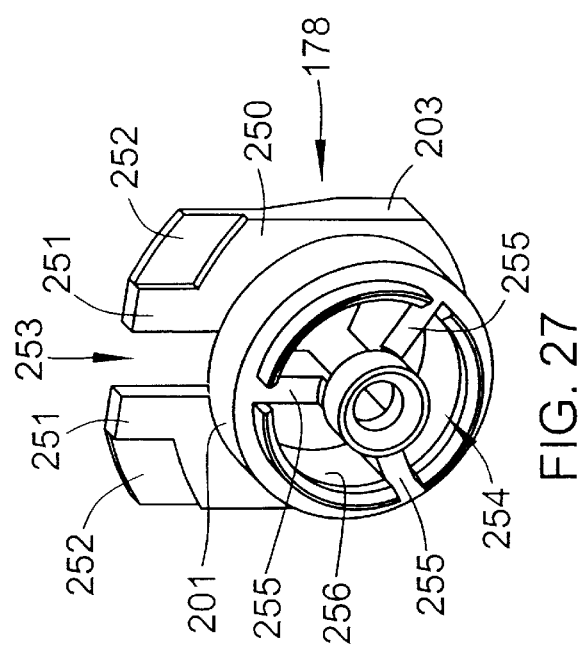

PRECALIBRATED FLOW METER WITH AIRFLOW COMPENSATOR

RELATED APPLICATIONS

The present application is a continuation-in-part of U.S. patent application Ser. No. 09/126,453, filed Jul. 30, 1998, which is based upon U.S. Provisional Application Ser. No. 60/057,034, filed Aug. 7, 1997, the complete disclosures of which are hereby expressly incorporated by reference.

TECHNICAL FIELD

The present invention is directed to flow meters which are used to measure the amount of fluid being dispensed or pumped. More particularly, the present invention is directed to flow meters which are precalibrated to accurately meter the flow of a variety of different fluids. The present invention is further directed to air flow compensators which compensate fluid flow measurements for air that passes through flow meters.

BACKGROUND ART

There are inherent internal leakage or "slippage" problems which effect the accuracy of flow meters, particularly volume displacement meters. Fluid which leaks or "slips" by the mechanical structures intended to monitor fluid flow does not contribute to the counting mechanism and thus must be accounted for by other means, such as adjusting gear ratios on mechanical counters or multiplying factors on electronic readouts.

The main cause of variation in the amount of slippage is the viscosity of the fluid. Thin or less viscous fluids tend to experience a greater amount of slippage than thick or more viscous fluids. Accordingly, for best accuracy, flow meters must be calibrated whenever fluid viscosities change significantly. In addition to varying between different fluids, viscosities can vary over temperature ranges.

Present flow meters are either precalibrated for a particular fluid or otherwise designed to be field calibrated. Precalibrated flow meters have the disadvantages of being limited for use with a particular fluid viscosity, and not being able to compensate for temperature related changes in viscosity. Field calibrated flow meters require pumping or dispensing of a small quantity of a fluid during calibration. This can present problems when using hazardous or expensive materials since the meter will not accurately measure the volume of fluid used to calibrate the meter. Moreover, containment or recovery of the volume of fluid used to calibrate the meter may be awkward, particularly if the fluid to be dispensed is stored in a container equipped with one-way valves which prevent the user from putting fluid back into the container.

The present invention provides for precalibrated flow meters which allow a user to accurately dispense or pump a variety of fluids without recalibrating the meter for each fluid. Moreover, the present invention provides air flow compensators which are used in conjunction with precalibrated flow meters to compensate fluid flow measurements for air or gas that passes through the precalibrated flow meters.

DISCLOSURE OF THE INVENTION

According to other features, characteristics, alternatives and embodiments which will be understood as the description of the present invention proceeds, the present invention provides an air flow compensator which includes:

a main slide element having a magnetic insert in one end thereof;

a proximity sensor for detecting the proximity of the magnetic insert;

a secondary slide element;

a first spring element that biases both the main slide element and the secondary slide element away from the proximity sensor; and a second spring element that biases only the secondary slide element away from the proximity sensor.

The present invention further provides an air flow compensator which includes:

a fluid flow passage having an inlet end and an outlet end;

a proximity sensor positioned adjacent the outlet end of the fluid flow passage;

a main slide element having a magnetic element in one end, the main slide element moveable between a first position in which the magnetic element is spaced away from the proximity sensor and a second position in which the magnetic element is near the proximity sensor;

a secondary slide element positioned on the main slide element for movement therewith and for independent movement along the main slide element, the position of the secondary slide element within the fluid flow passage being determinative of the amount of fluid that can flow therethrough;

a first spring element that biases the secondary slide toward the inlet end of the fluid flow passage; and a second spring element that biases the main slide element toward the inlet end of the fluid flow passage.

The present invention also provides a precalibrated flow meter which includes:

a body having an inlet and an outlet;

a fluid driven element within the body that moves in response to fluid flow between the inlet and the outlet;

a memory storage device for storing a plurality of calibration factors which correspond to different fluid viscosities;

means for selecting one of the plurality of calibration factors;

means for calculating fluid flow between the inlet and the outlet from the selected one of the plurality of calibration factors;

an air flow compensator in the inlet of the body, the air flow compensator including:

a cartridge body having an inlet end and an outlet end;

a proximity sensor positioned adjacent the outlet end of the cartridge body;

a main slide element having a magnetic element in one end, the main slide element moveable between a first position in which the magnetic element is spaced away from the proximity sensor and a second position in which the magnetic element is near the proximity sensor;

a secondary slide element positioned on the main slide element for movement therewith and for independent movement along the main slide element, the position of the secondary slide element within the cartridge body being determinative of the amount of fluid that can flow therethrough;

a first spring element that biases the secondary slide toward the inlet end of the cartridge body; and a second spring element that biases the main slide element toward the inlet end of the cartridge body; and means for compensating the calculated fluid flow for air detected by the air flow compensator which passes through the cartridge body.

BRIEF DESCRIPTION OF DRAWINGS

The present invention will be described with reference to the attached drawings which are provided as non-limiting examples in which:

FIG. 20 is a cross-sectional view of the air flow compensator assembly of FIG. 19

FIG. 21 is an exploded view of the air flow compensator assembly of FIG. 20.

FIG. 25 is front perspective view of a spring stop according to one embodiment of the present invention.

FIG. 26 is a rear perspective view of the spring stop of FIG. 25.

FIG. 27 is a front perspective view of an arm support according to one embodiment of the present invention.

FIG. 28 is a rear perspective view of the arm support of FIG. 27

BEST MODE FOR CARRYING OUT THE INVENTION

Figure 3:
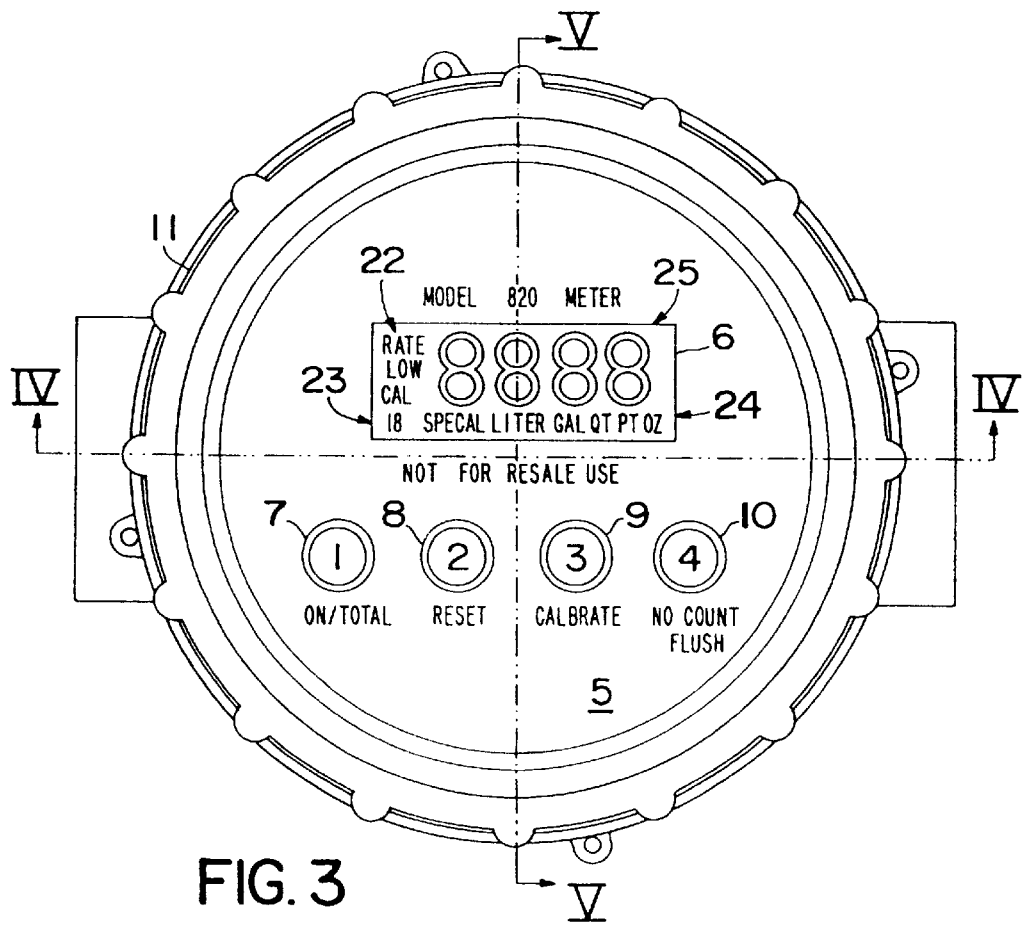
FIG. 3 is a top view of the flow meter of FIG. 1.

The present invention is directed to precalibrated flow meters which are programmed with a plurality of Calibration Factors. The Calibration Factors are user selectable and enable the flow meter to be used to accurately measure the volume of a variety of dispensed or pumped fluids having different viscosities. In this regard, the Calibration Factors compensate for fluid slippage due to viscosity differences and/or flow rates. As noted above, fluid slippage is inversely proportional to viscosity, which varies between fluids and over temperature ranges. In addition to being dependent upon viscosity variations, fluid slippage is also dependent on flow rate. That is, more internal slippage tends to occur at higher flow rates due to a higher pressure differential across the meter. Accordingly, in a preferred embodiment, the flow meters of the present invention can compensate for fluid slippage that is due to viscosity variations and changes in flow rate.

The flow meters of the present invention are provided with an electronics module which monitors a flow signal generated by fluid flowing through the meter, and calculates therefrom units, e.g. quarts, liters, gallons, etc. of fluid being dispensed or pumped. For example, the amount of fluid which passes through the meter can be calculated by the following formula:

Amount of fluid=((Flow Signal Count)×(Calibration Factor)× (Chamber Factor))/(Units Value)

In this formula the flow signal count is the signal which the meter is designed to produce for a particular flow rate. For example, a positive displacement meter equipped with a rotating magnet that is coupled to a fluid driven element and reed switch will generate a series of pulses for every revolution of the magnet. For such a meter the flow signal count will be the magnetic pulse count produced by the reed switch. Flow signal counts for other types of meters can include pressure signals, pressure differential signals, electrical signals generated by vibrating reeds, other rotating structures, hall effect sensors, etc.

The Calibration Factor is a user selectable factor which corresponds to a particular fluid viscosity. This factor is programmed into the memory of the electronics module. Ideally, a plurality of Calibration Factors, e.g., 20 or more, is provided which covers the viscosities of a wide range of fluids. According to one meter which was designed during the course of the present invention, Calibration Factors of approximately 0.80 to 1.10 were determined to be sufficient to meter fluids ranging from 0.8 cps (gasoline) to 4000 cps (SAE 1000 weight oil) with an accuracy of 0.2 percent or better.

A list or chart of the Calibration Factors which correlates various Calibration Factors with specific fluids and/or fluid temperatures can be supplied with the meter so that the user merely looks up a particular fluid on the list or chart and selects an appropriate calibration factor prior to dispensing or pumping a fluid. Meters having electronic modules capable of storing and recalling 20 Calibration Factors or more will be able to allow quick field calibration for a large number of fluids since some fluids having similar viscosities may require the use of the same Calibration Factors. In addition some fluids such as oils have temperature dependent viscosities which may require the meter to be set to different Calibration Factors which correlate to different fluid temperatures. Greater numbers of Calibration Factors provided for a given range of viscosities will allow more accurate calibration of the meters. It is also possible to include a temperature sensing circuit into the electronics module and automatically sense and compensate for temperature differences.

The Chamber Factor is a number which corresponds to a specific meter chamber, and is used to compensate for any variations that may occur during the manufacturing process. The Chamber Factor is determined by factory calibration and is generally between 0.95 and 1.04.

The units value in the above formula relates the flow signal count to a selected unit such as quarts, liters, gallons, etc. In addition to volume units, it is also possible to include a units value which corresponds to an area of application, for example, ounces per acre. Such units may be more convenient for applying pesticides in agricultural applications.

The above formula can also include a multiplication factor which provides a correction factor for fluid flow rate. As discussed above, higher flow rates tend to increase fluid slippage. Accordingly, a factor may be included in the above formula which is based upon a preliminary sensed flow rate and used to compensate for variations in fluid slippage which are flow rate dependent.

The present invention is further directed to air flow compensators which can be used in conjunction with the flow meters of the present invention to detect, monitor and/or compensate for air flow through the flow meters.

In the attached figures, common reference numbers have been used for similar elements whenever possible.

Figure 1:
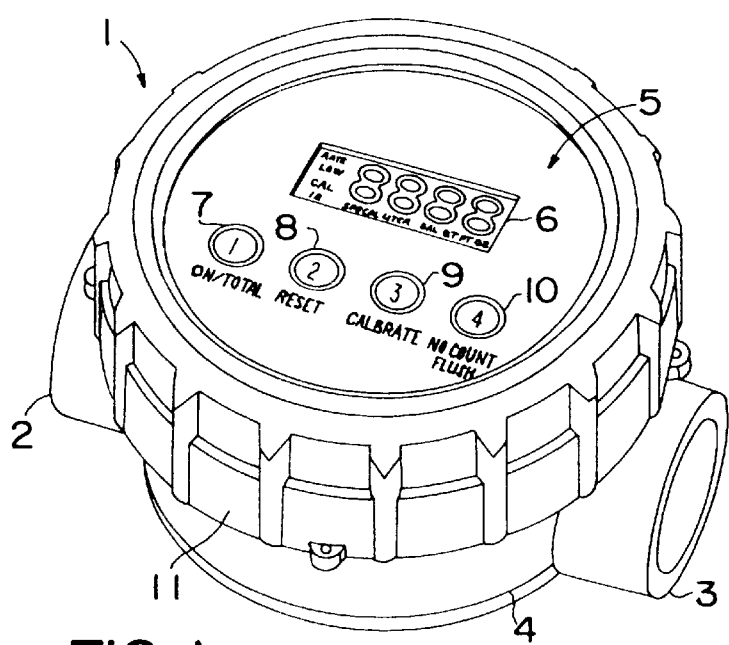
FIG. 1 is a perspective view of a flow meter according to one embodiment of the present invention.

FIG. 1 is a perspective view of a flow meter according to one embodiment of the present invention. The flow meter generally identified by reference number 1 includes a fluid inlet 2 and a fluid outlet 3 which extend from a meter body 4. The face 5 of the flow meter 1 includes a display 6 which can be a liquid crystal display, light emitting diode display or other digital display. The face 5 of the flow meter 1 also includes several buttons or touch pads 7, 8, 9 and 10 which are used to select different operation modes and Calibration Factors.

The face 5 of the flow meter 1 is coupled to the meter body 4 by a meter cap 11 which forms a fluid tight seal that protects the internal components of the flow meter 1, including the electronics module.

Figure 2:
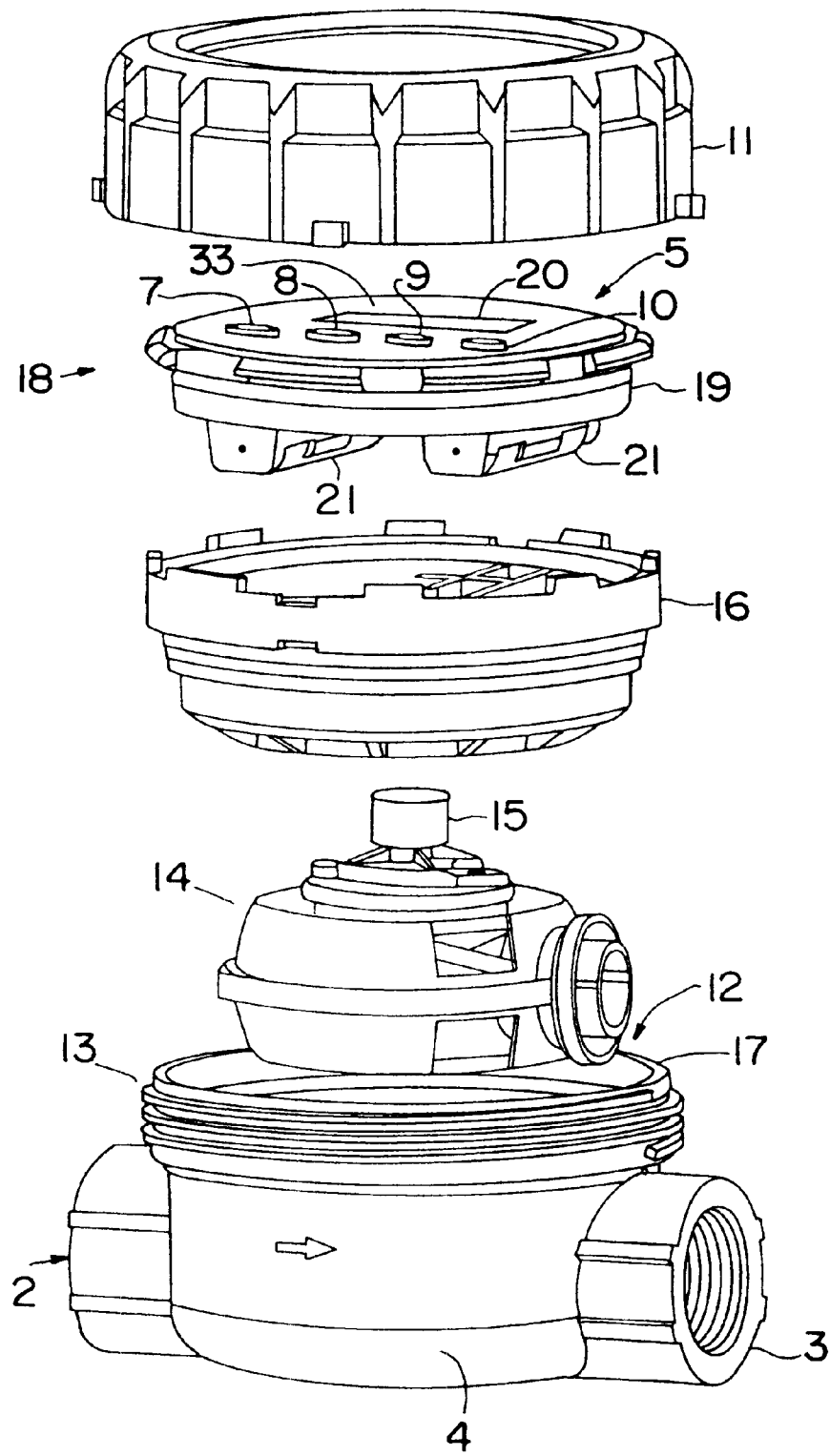
FIG. 2 is an exploded view of the flow meter of FIG. 1.

FIG. 2 is an exploded view of the flow meter of FIG. 1. The meter body 4 of the flow meter 1 is depicted as having an internally threaded inlet 2 and outlet 3. In alternative embodiments, the inlet 2 and/or outlet 3 ports could include external threads, or other quick coupling structures such as bayonet lugs, which can be used to couple the flow meter to a pipe, hose, etc. The meter body 4 defines a chamber 12 through which fluid flows as it enters the inlet 2 and passes through the outlet 3.

The top of the meter body 4 is provided with external threads 13 which cooperate with corresponding internal threads (not shown) on the meter cap 11.

The flow meter depicted in FIG. 2 includes a meter chamber 14 which houses a fluid driven member that rotates a magnet holder 15 located on an upper portion thereof. The meter chamber 14 is sealed within chamber 12 by a meter cover 16 which is received within the upper opening 17 of the meter body 4. According to one embodiment, the meter cover 16 can be provided with mechanical coupling structure such as threads which cooperate with corresponding structure, e.g. threads, provided in the meter body 4. In an alternative embodiment depicted in FIGS. 4 and 5 the meter cover 16 merely sits against the upper opening in meter body 4 and is sealed therein by pressure applied thereto by meter cap 11.

The electronics module 18 includes a support plate 19 which supports the face 5 of the flow meter on an upper side and the electrical components on an opposite, lower side. The display 20 is provided in the face 5 of the meter and the touch pads 7, 8, 9, and 10 are located on the face 5 of the flow meter. A display label 33 with printed indicia is superposed on the face 5. A microcontroller controls the operation of the flow meter and can be secured to the lower surface of the support plate 19 at any convenient location. One or more batteries 21 which power the flow meter are also secured to the lower surface of the support plate 19.

The support plate 19 is secured in position by tightening the meter cap 11 onto the meter body 4 using the cooperating threads which are discussed above. Not shown in FIG. 2 are seal members, e.g., gaskets or o-rings, which can be provided between the meter cover 16 and the meter body 4, and between the electronics module 18 and the meter cover 16, and between the meter cap 11 and the meter body 4. Such seal members will seal off the various areas or portions of the flow meter and protect the internal components which are not intended to come in contact with the fluid being dispensed or pumped or any other fluid or material that the flow meter may come in contact with.

FIG. 3 is a top view of the flow meter of FIG. 1. The face of the meter shown in FIG. 3 depicts one optional manner of arranging the display 6 and the touch pads 7, 8, 9, and 10. As shown, the display 6 includes an area 22 which can indicate a low battery condition, an area 23 which can identify selected Calibration Factors, an area 24 which can identify the type of units the flow meter is monitoring, and an area 25 which displays the number of units being pumped or dispensed. In addition to the display 6, the face 5 of the flow meter includes, according to the embodiment shown, a touch pad 7 which can power up the electronic module, a touch pad 8 which can be used to reset the number of units in the display 6, a touch pad 9 which is used to select the Calibration Factor, and a touch pad 10 which can deactivate the flow meter so that fluids passing therethrough are not metered.

It is to be understood that the layout of the display 6 and touch pads 7, 8, 9, and 10 (and number of touch pads) on the face 5 of the flow meter can be altered or rearranged in any manner which is convenient.

Figure 4:
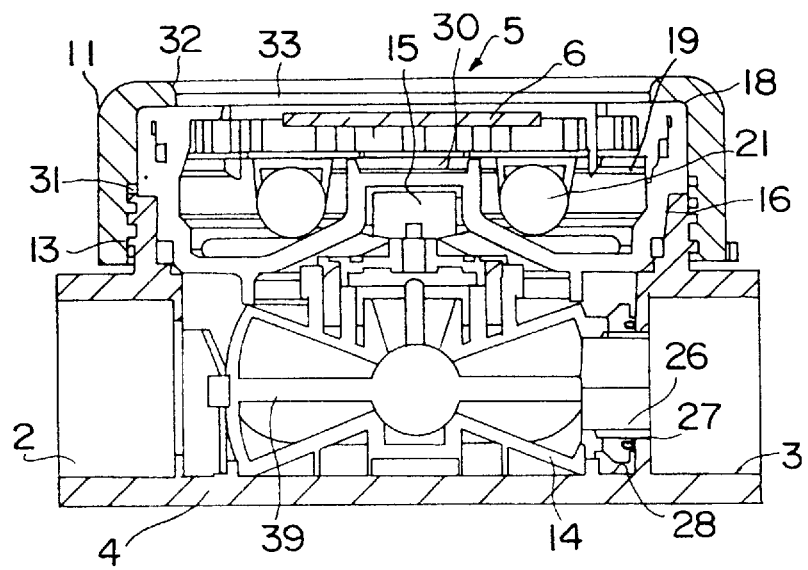
FIG. 4 is a cross-sectional view of the flow meter of FIG. 4 taken along line IV—IV.

FIG. 4 is a cross-sectional view of the flow meter of FIG. 3 taken along line IV—IV. FIG. 4 shows the snout 26 of the meter chamber 14 as being aligned with and sealed against the outlet 3, by means of snout o-ring seal 27 and a snout seal gland 28. A magnet holder 15 is attached to the top of the meter chamber 14 and coupled to fluid driven member 39, e.g. nutating disc or fluid driven elliptical gear which causes the magnet holder 15 to rotate. A magnet 29 is provided in the magnet holder 15. As depicted, a reed switch 30 is provided at the lower surface of the electronics module 18 in alignment with magnet 29. In this alignment, rotation of the magnet 29 will cause the reed switch 30 to close and open, thus generating two pulses for every rotation of the fluid driven member 39. The display 6 is depicted in FIG. 4 as being positioned beneath an opening of the face 5 of the flow meter.

The internal threads 31 on the lower portion of the meter cap 11 are depicted as being engaged with corresponding external threads 13 on the upper portion of the meter body 4. Seal elements can be provided between the support plate 19 and meter cover 16 and between the meter cover 16 and meter chamber 14. The meter cap 11 includes a radially inward directed flange 32 which secures a display label 33 that includes the indicia depicted in FIG. 3. FIG. 4 depicts the location of batteries 21 which are used to power the electrical module 18. The other electrical components of the electrical module 18 are arranged on the lower surface of the support plate 19 in any convenient arrangement.

Figure 5:
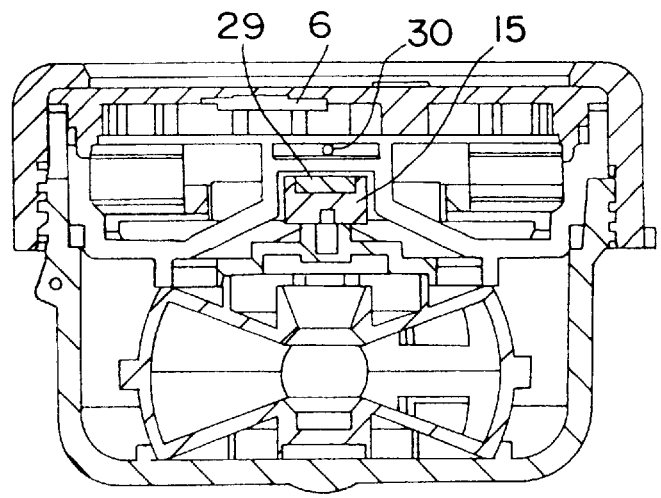
FIG. 5 is a cross-sectional view of the flow meter of FIG. 4 taken along line V—V.

FIG. 5 is a cross-sectional view of the flow meter of FIG. 3 taken alone line V—V. FIG. 5 depicts the alignment of reed switch 30 and magnet 29 and display 6.

When the flow signal count is a pulse that is produced by the reed switch 30 and rotatable magnet 29 of FIGS. 4 and 5, the support plate 19 and display 6 can be oriented in any manner with respect to the meter body 4. This allows the face 5 of the flow meter to be aligned for easy reading, regardless of the manner in which the flow meter is installed. It is noted that although the inlet 2 and outlet 3 are depicted as being coaxially aligned in the figures, the flow meters of the present invention may have inlets and outlets which are not coaxially aligned.

Figure 6:
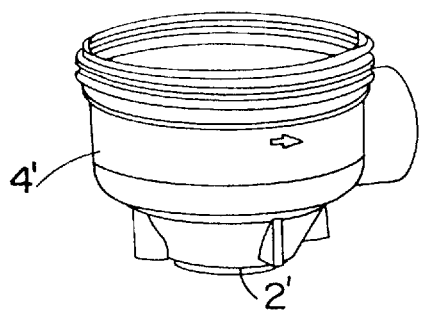
FIG. 6 is a perspective view of an alternative meter body.

FIG. 6 is a perspective view of an alternative meter body. The meter body 4' in FIG. 6 is essentially similar to the meter body 4 in FIG. 2 except that the inlet 2' is located on the bottom of the meter body 4'. Providing the inlet 2' in the bottom of the meter body 4' allows the flow meter to be mounted on barrels, storage tanks, drums, and the like, using NPT threaded bung adapters, buttress threaded bung adapters, bayonet connectors, direct threaded connections, threaded couplers, or the like.

Figure 7:
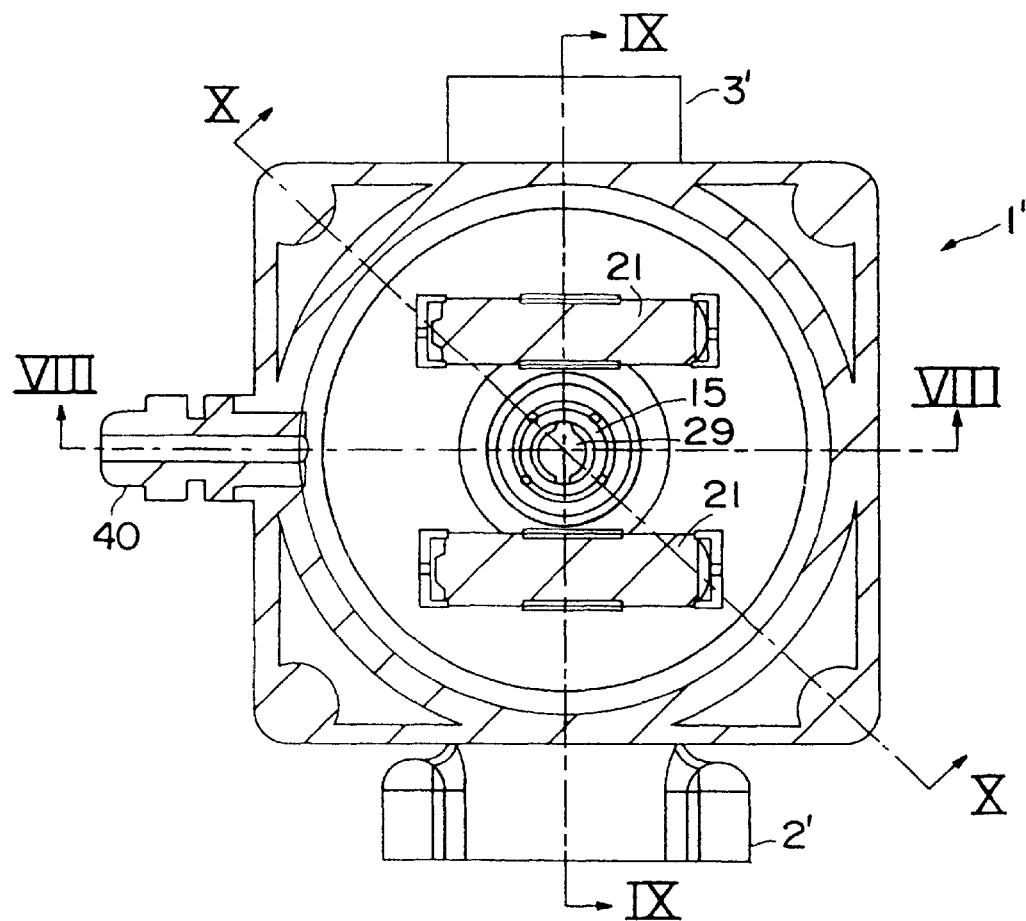
FIG. 7 is a top sectional view of an alternative flow meter design.

FIG. 7 is a top sectional view of an alternative flow meter design. The flow meter of FIGS. 7–10 differs from the flow meter of FIGS. 1–5 in the overall shape of the meter body 4' and the meter chamber 14' which houses the fluid driven element 39, e.g. nutating disk or elliptical gear. Also, the meter cap 11' replaces both the meter cap 11 and meter cover 16 and is secured to the meter body 4' by mechanical fasteners 42. The electronics module 18, electrical circuit components, magnet 29, magnet holder 15, reed switch 30, fluid driven device 39, display 20, and batteries 21 are all common to both flow meters. The flow meter 1' of FIGS. 7–10 has a rectangular or square shape with an inlet 2' and an outlet 3'. The inlet 2' and outlet 3' can have threaded structures by which the flow meter 1' can be coupled to fluid lines or a source of fluid to be dispensed. FIG. 7 (and FIG. 8) also depicts an electrical signal output port 40 through which a wire can passed and be coupled to the electronic module for purposes of remotely monitoring the readings from the flow meter 1'. For example, an electrical connection can be made to the electronic module and used to deliver pulses therefrom to a remote processor or controller. Other electrical connections to the electronic circuit could be used in conjunction with remote display and/or process control systems. As discussed in more detail below, other electrical connections to the electronic circuit could be used to compensate for air passing through the flow meter. The electrical signal output port 40 can comprise either a sealed port, e.g. provided with a sealing means such as a boot, or an electrical connector which receives a plugin type terminal. FIG. 7 also depicts the locations of the magnet 15, magnet holder 29, and batteries 21 which are similar to the flow meter of FIGS. 1–5.

Figure 8:
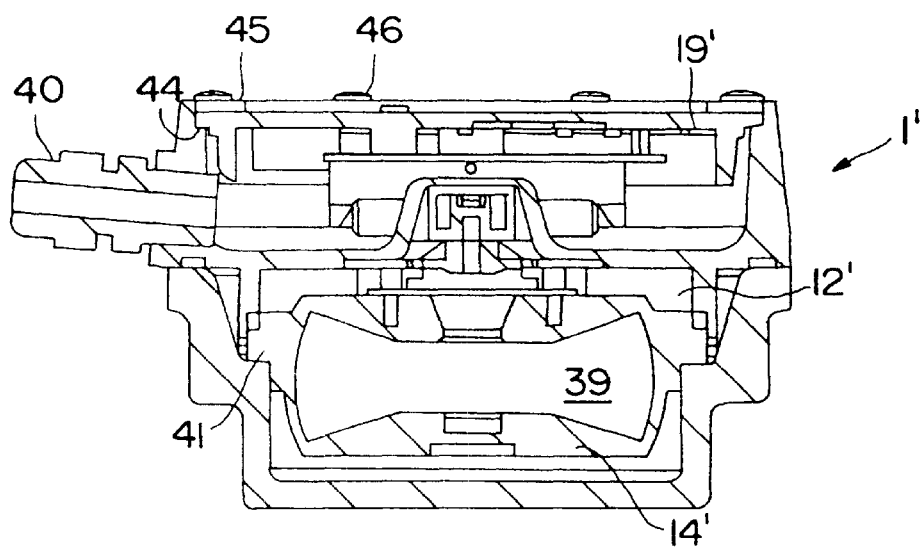
FIG. 8 is a sectional view of the alternative flow meter of FIG. 7 taken along plane VIII—VIII.
Figure 9:
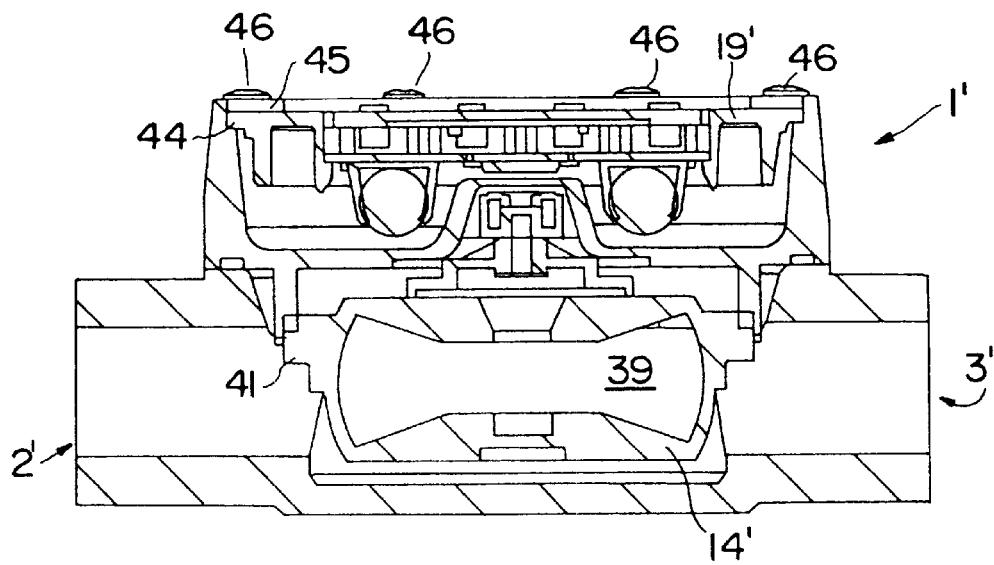
FIG. 9 is a sectional view of the alternative flow meter of FIG. 7 taken along plane IX—IX.

FIG. 8 is a sectional view of the alternative flow meter of FIG. 7 taken along plane VIII—VIII. FIG. 9 is a sectional view of the alternative flow meter of FIG. 7 taken along plane IX—IX. The flow meter 11 of FIGS. 7–10 includes a meter body 4' having the inlet port 2' and outlet port 3 (see FIG. 9). It is noted that the flow meter 1' of FIGS. 7–10 can include the inlet port 2' in the bottom thereof as depicted in FIG. 6. The meter body 4' defines a chamber 12' through which fluid flows as it enters the inlet 2' and passes through the outlet 3'. The meter chamber 14' which houses the fluid driven element 39' has an outer structure, e.g. flange 41 by which it is aligned with the inlet 2' and outlet 3'. The outlet 3' can include an o-ring seal and a snout seal gland to allow coupling thereof to a snout formed at the outlet as described in reference to FIG. 4 above.

Figure 10:
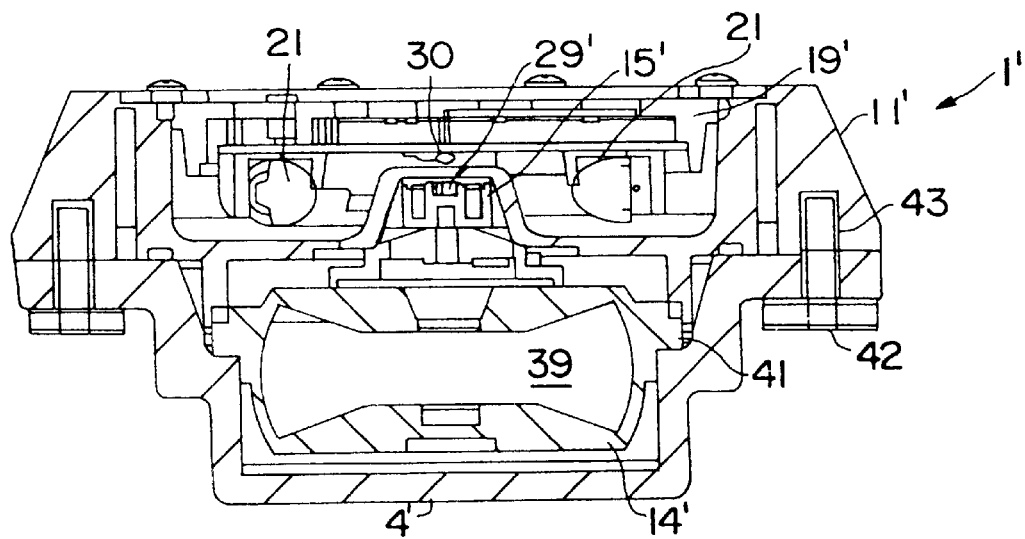
FIG. 10 is a sectional view of the alternative flow meter of FIG. 7 taken along plane X—X.

A meter cap 11' which includes clearance for receiving magnet holder 15' and 29' is coupled to the meter body 4' by means on mechanical fasteners 42 (FIG. 10) that are received in the bores 43 depicted in FIG. 10. In this regard, the bores 43 can be threaded to receive mechanical fasteners which may in one embodiment be threaded screws or bolts. A seal member can be provided between the meter body 4' and the meter cap 11' in order to ensure a fluid tight connection between these two elements.

The support plate 19' is received in the top of the meter cap 11' and can be supported on a continuous or discrete stepped rim structure 44. The support plate 19', display and label are held in position by an annular retainer 45 which is coupled to the meter cap 11' by a plurality of mechanical fasteners 46.

FIG. 10 is a sectional view of the alternative flow meter of FIG. 7 taken along plane X—X. FIG. 10 depicts the mechanical fasteners 42 which are received in bores 43 and used to secure the meter cover 16' to the meter body 4'.

Figure 11A:
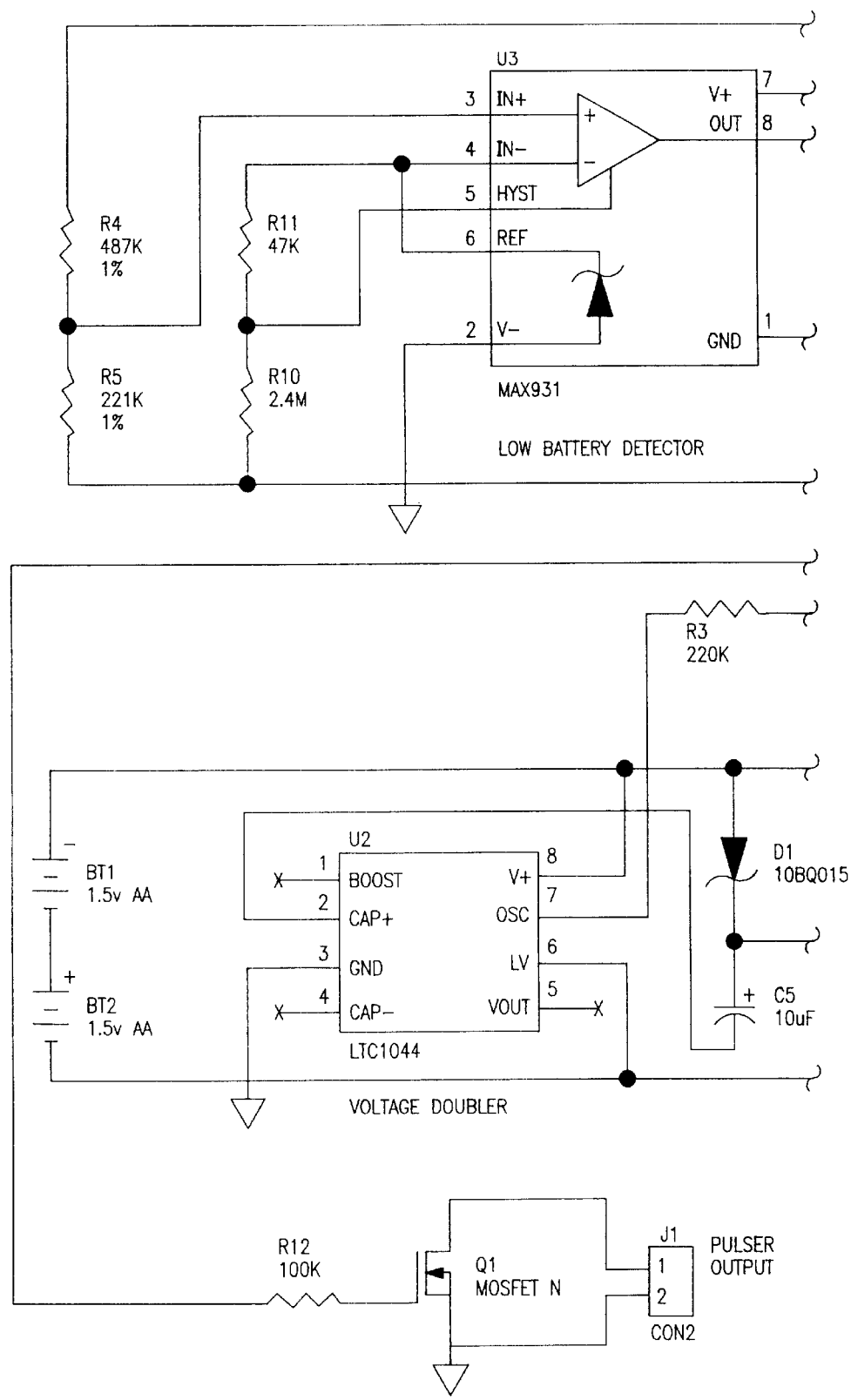
FIG. 11 is a schematic diagram of the circuit for the electronic components of the flow meter according to one embodiment of the present invention.
Figure 11B:
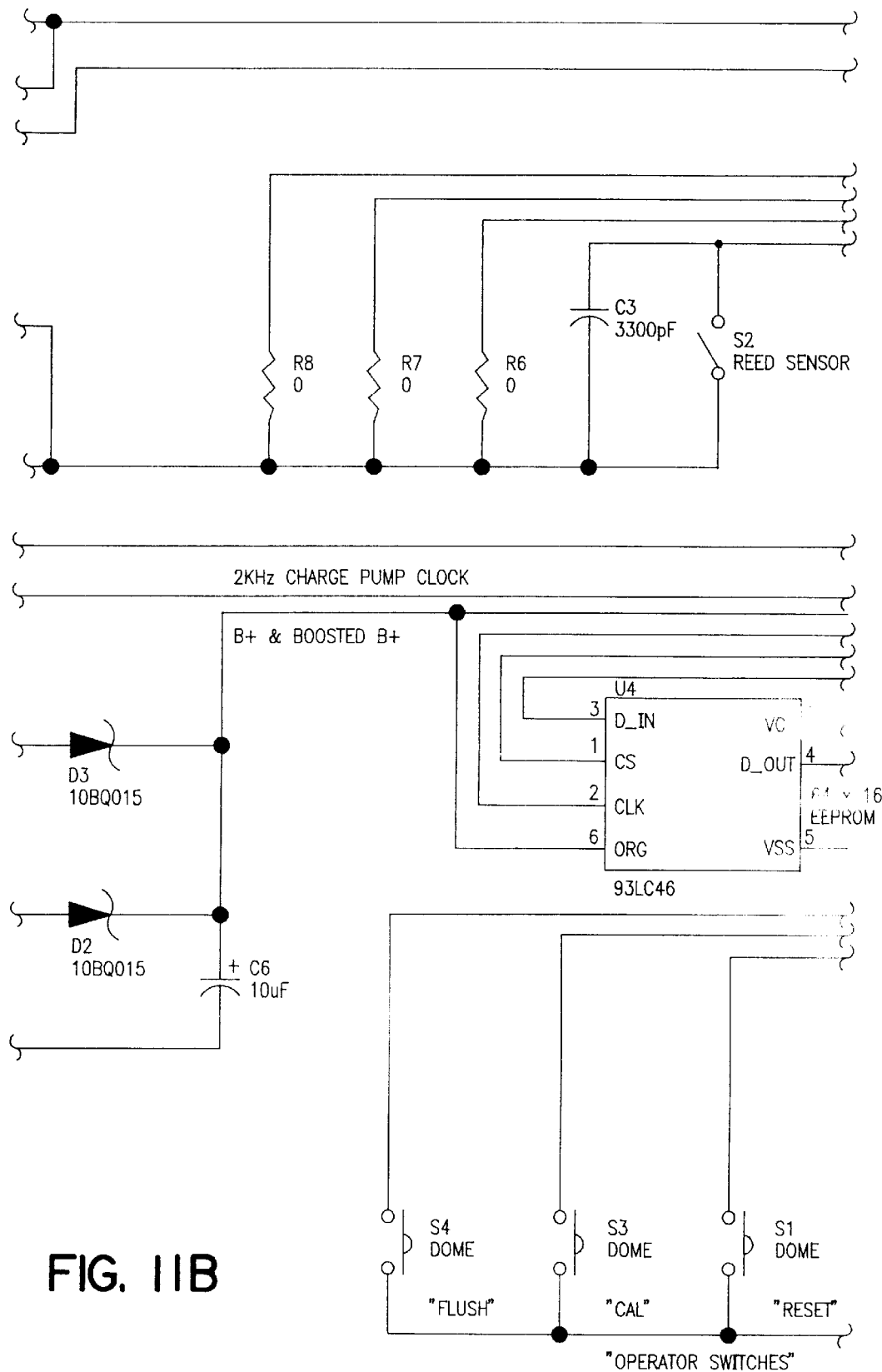
Figure 11C:
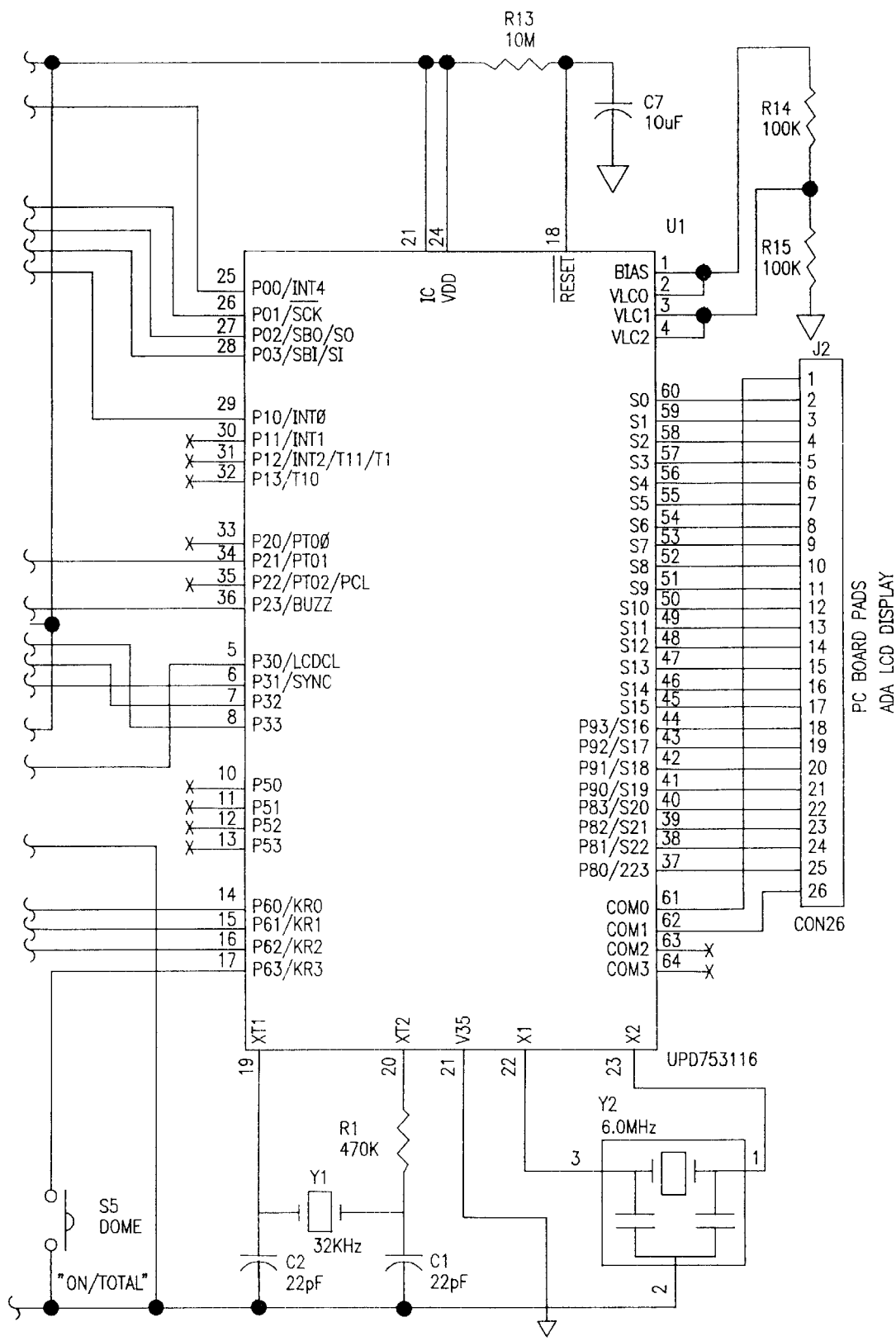
Figure 12A:
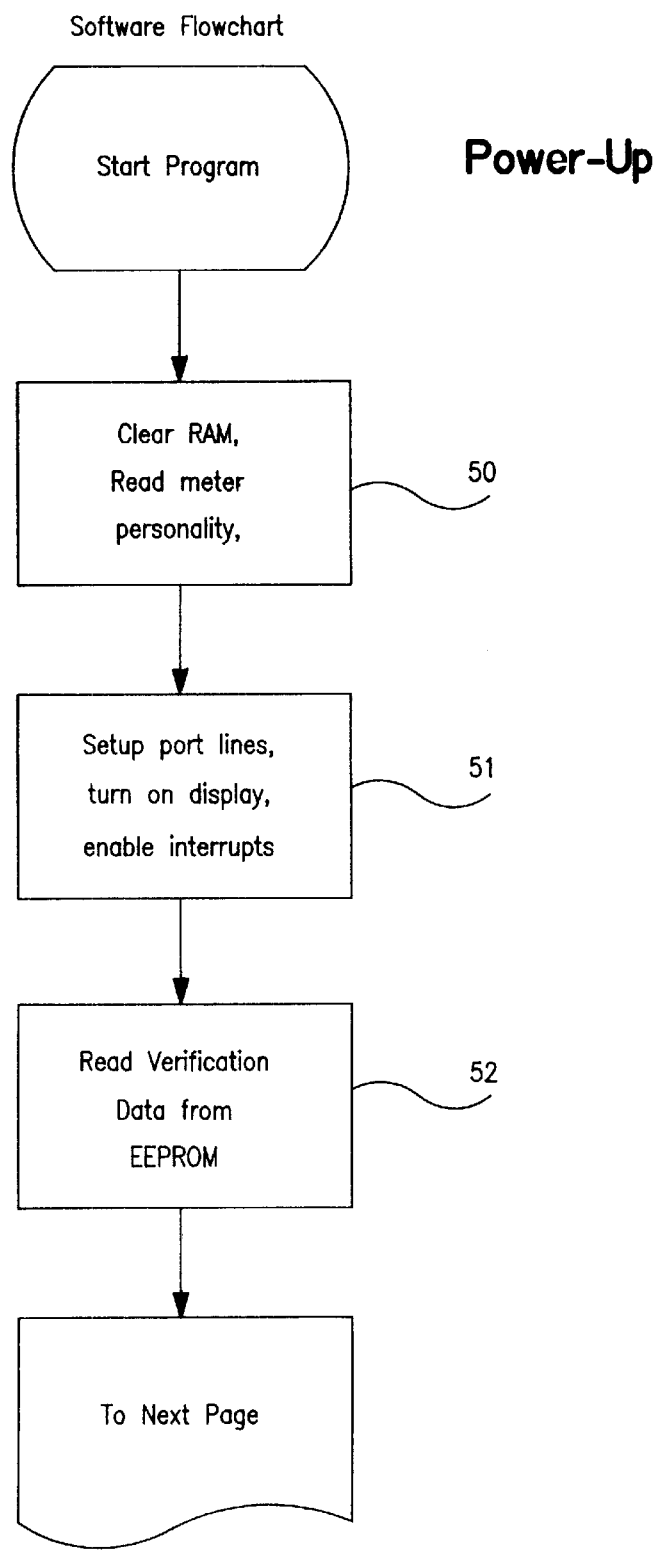
FIGS. 12a–12j comprise a flowchart that illustrates one manner in which the software of the flow meter of the present invention can function.
Figure 12B:
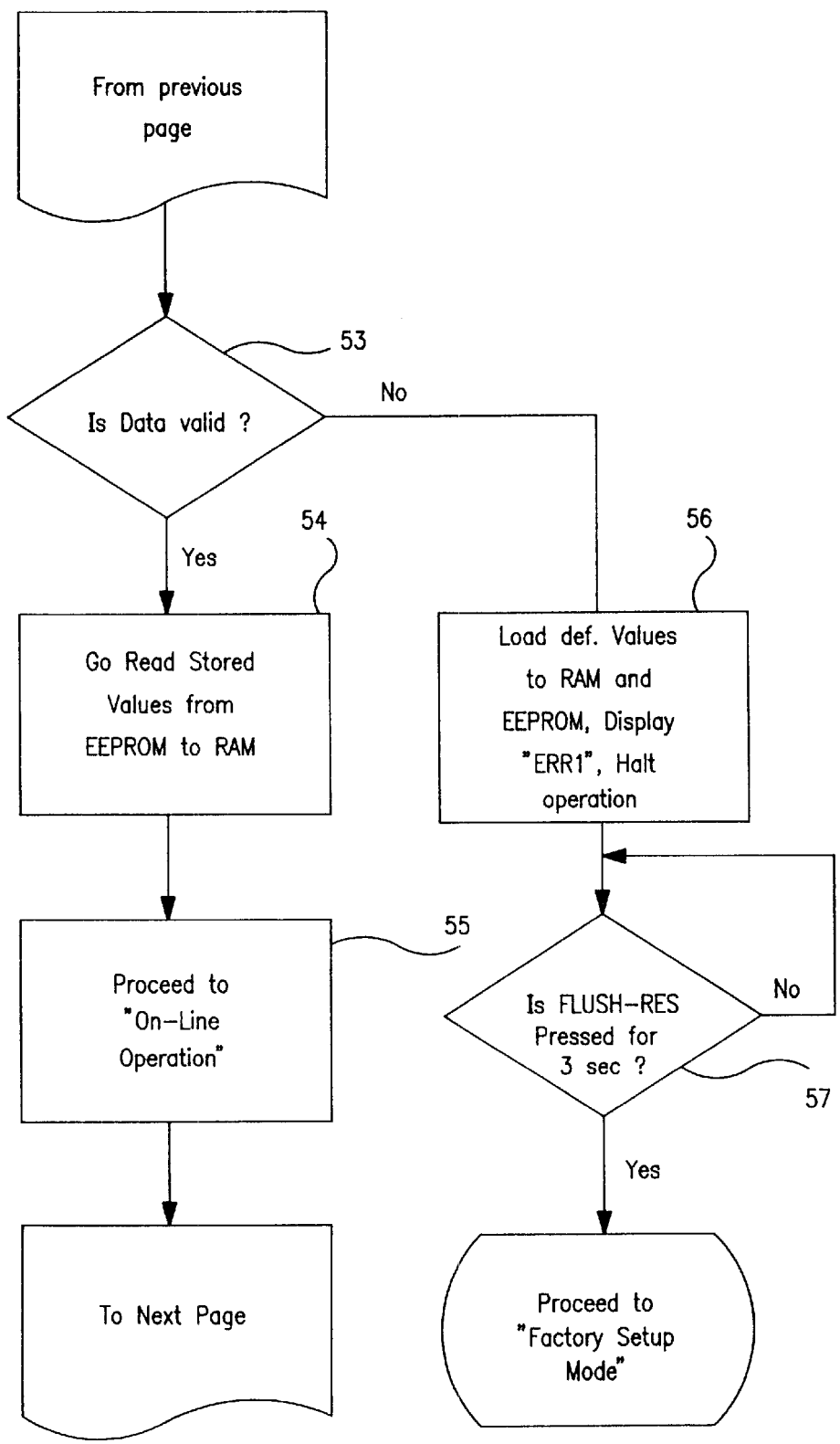
Figure 12C:
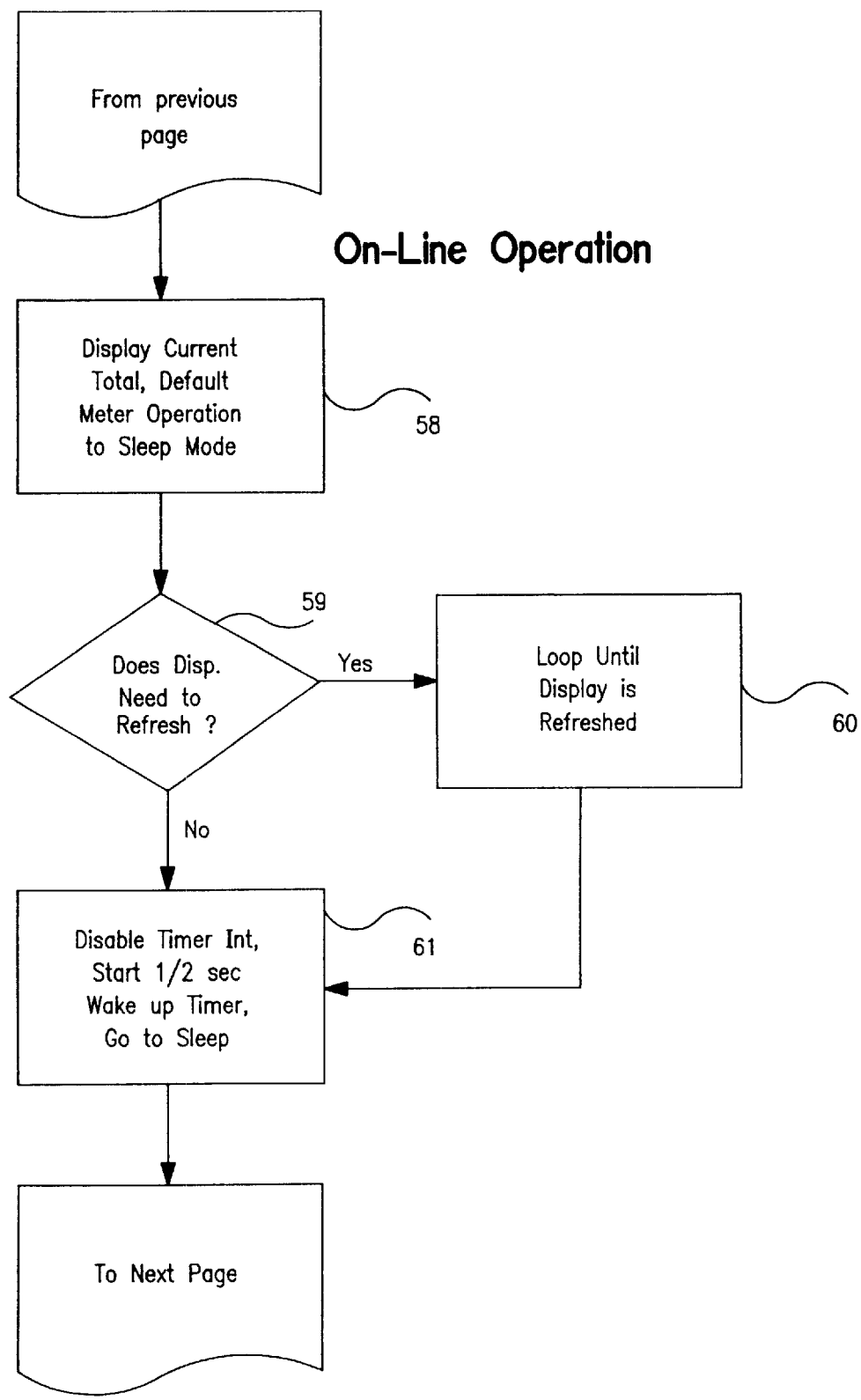
Figure 12D:
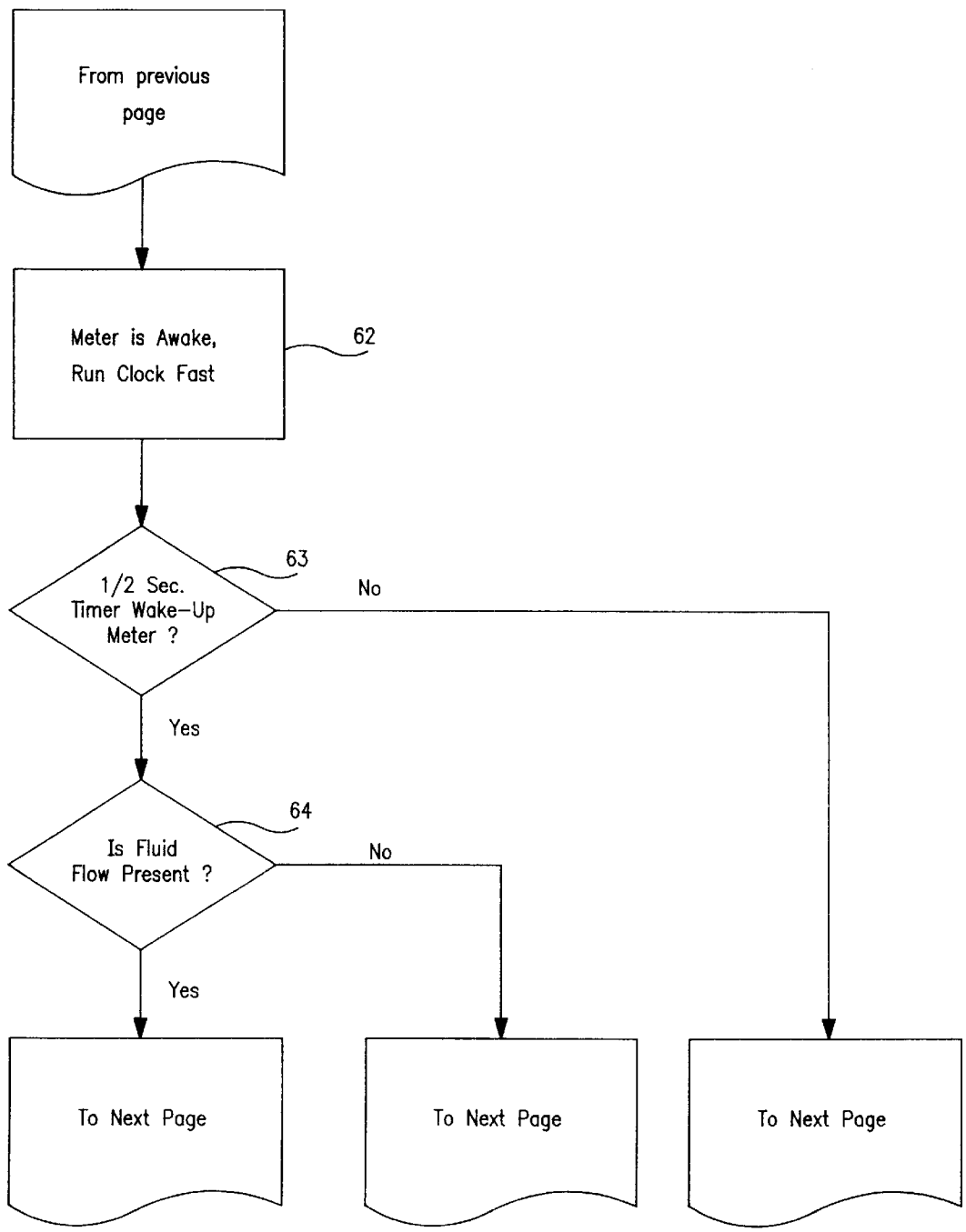
Figure 12E:
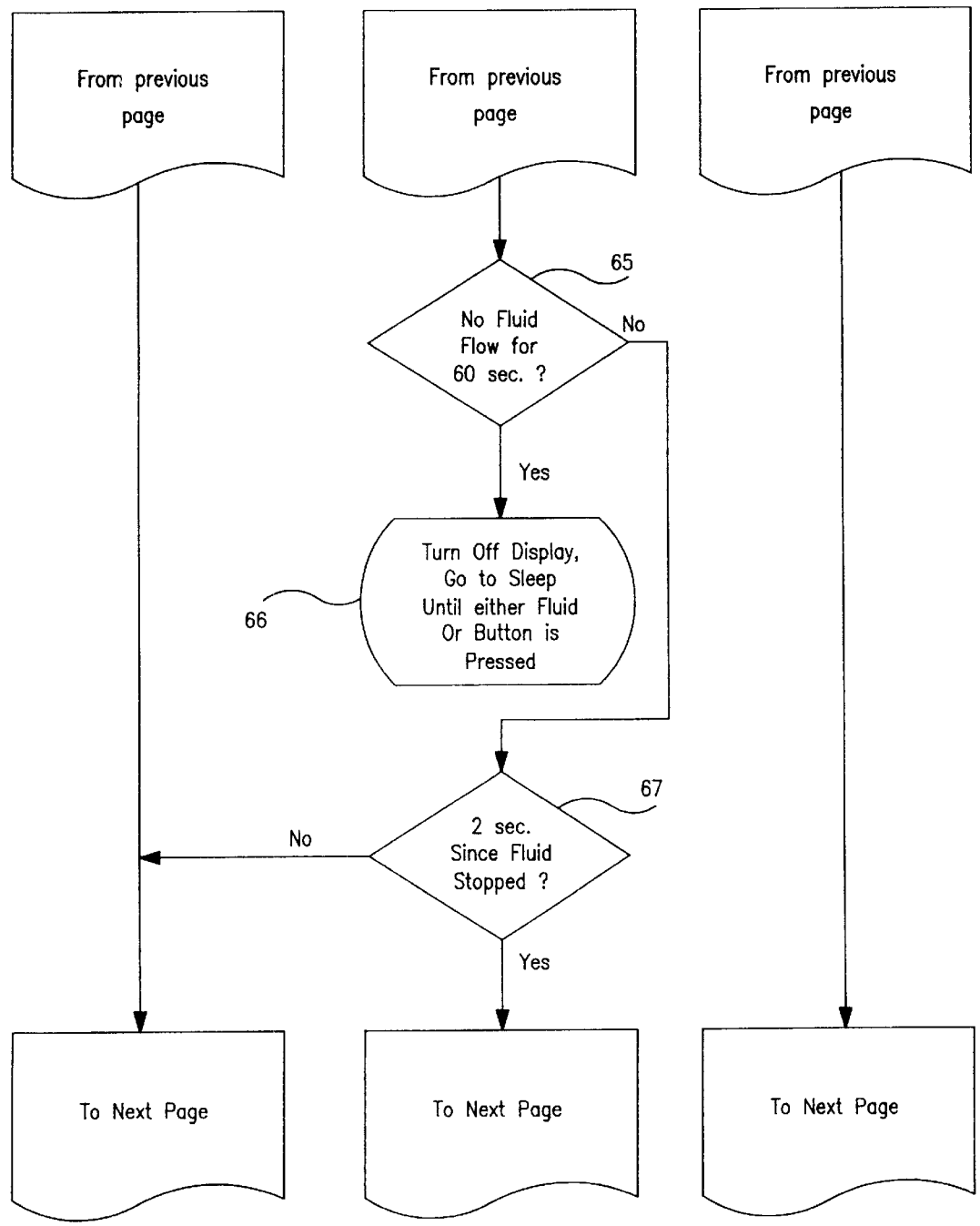
Figure 12F:
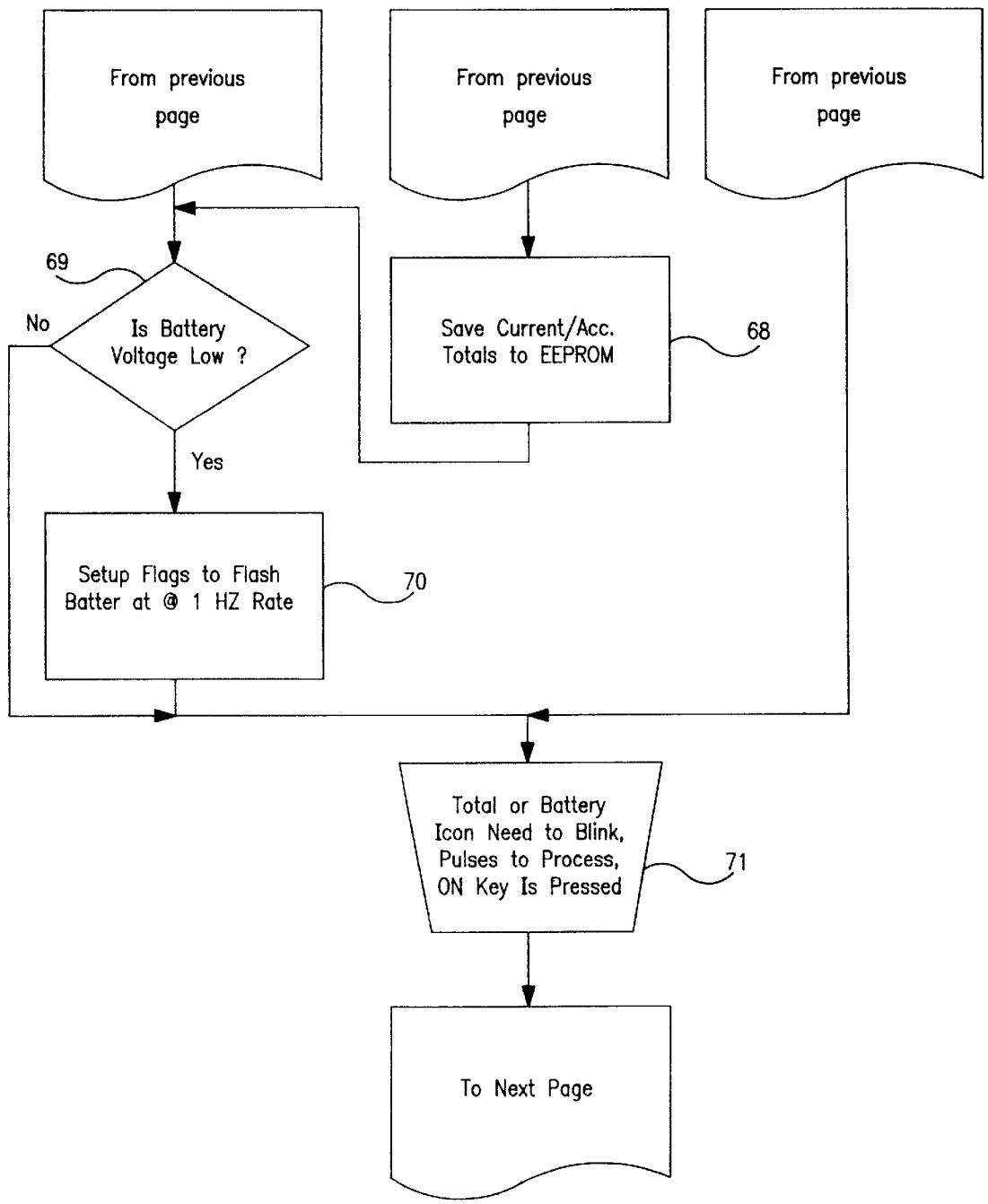
Figure 12G:
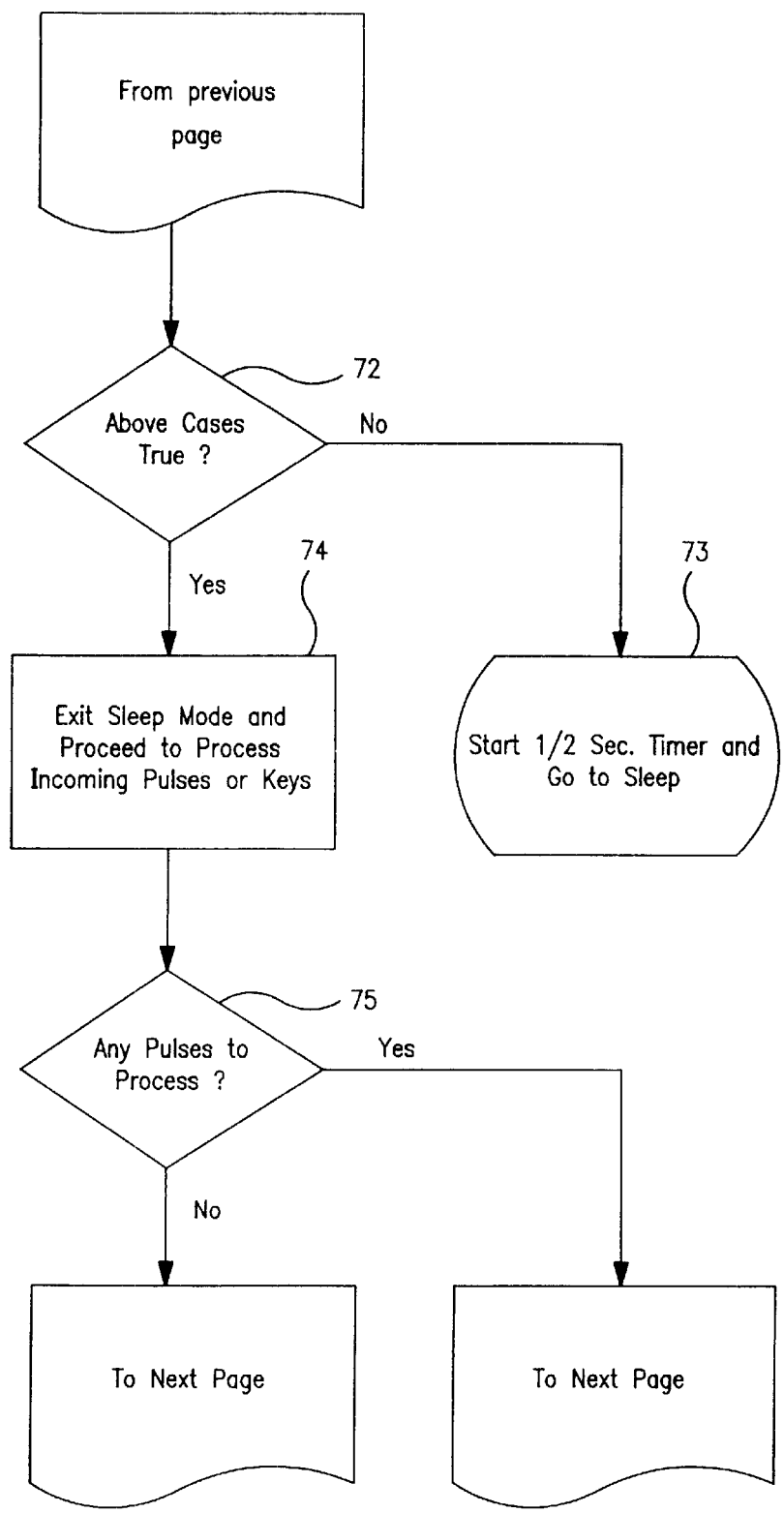
Figure 12H:
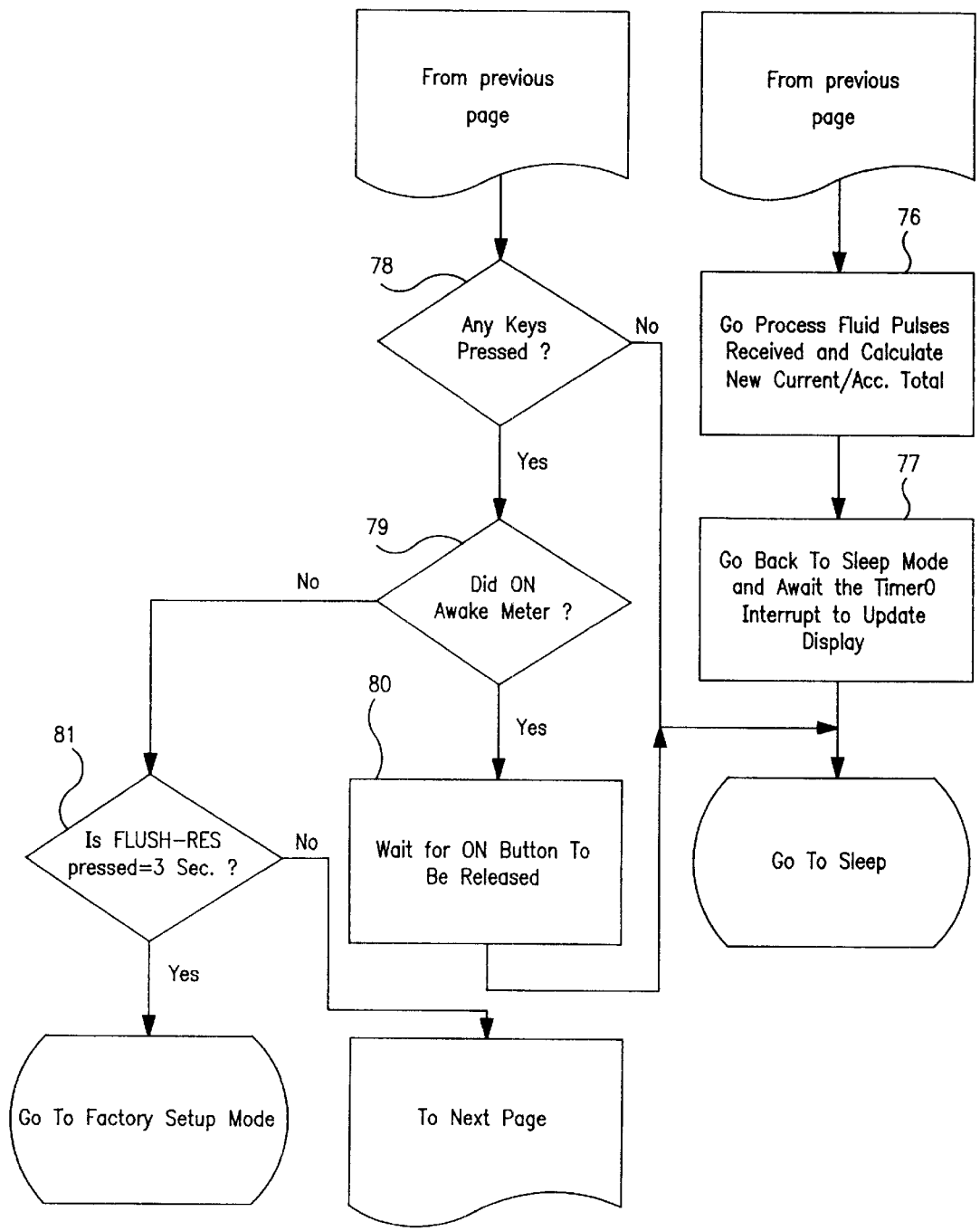
Figure 12:
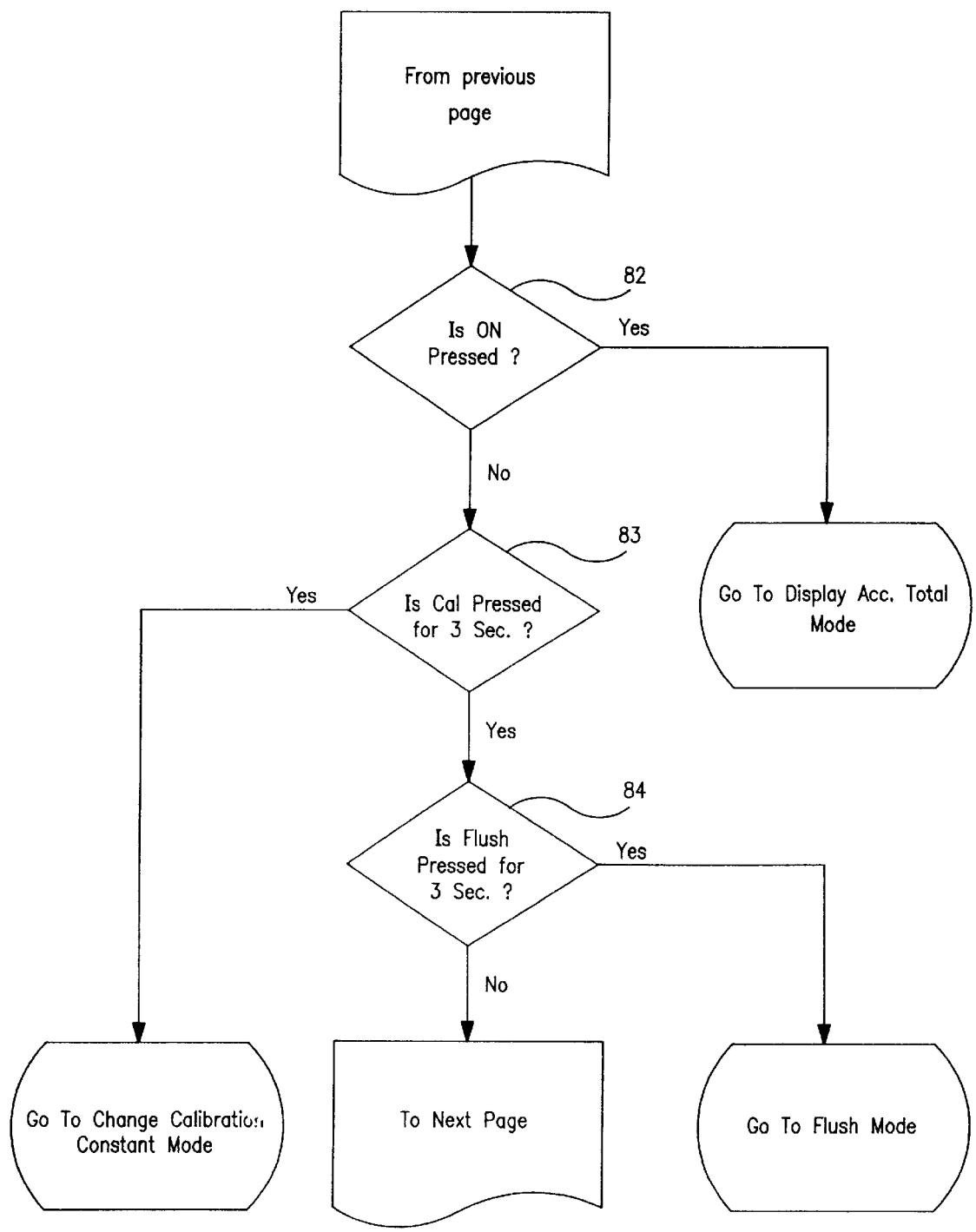
Figure 12J:
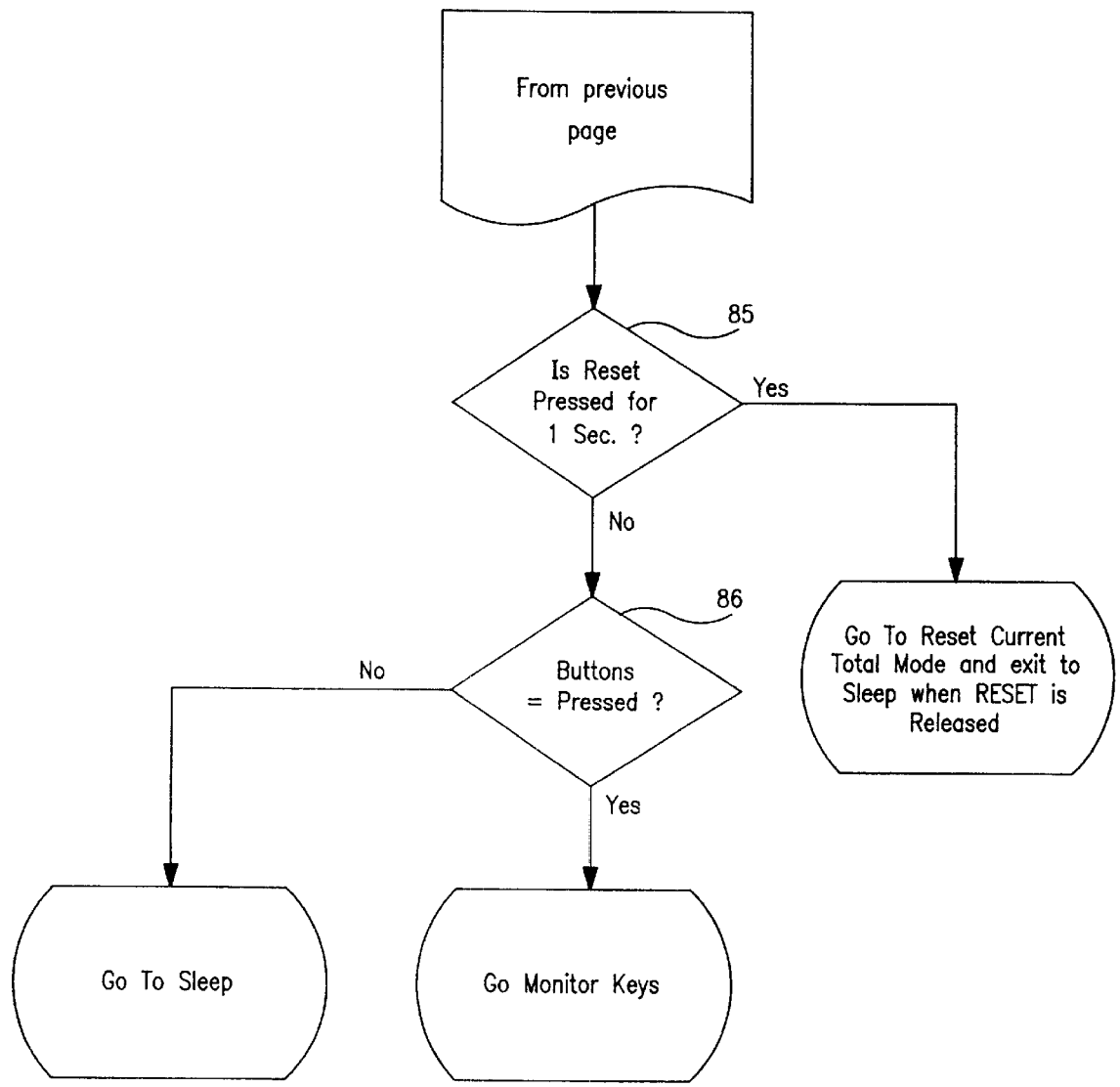

FIG. 11 is a schematic diagram of the circuit for the electronic components of the flow meter according to one embodiment of the present invention. Microcontroller U1 controls the operation of the flow meter. An LCD display can be coupled directly to the processor segment and common ports of the microcontroller as depicted by a flexible printed circuit known as a heat-seal connector. The use of 24 segment lines as depicted in FIG. 11 allows the multiplex rate to drop down from 4:1 to 2:1, thereby greatly enhancing the viewability of the display at high and low temperature ranges. A voltage divider which includes resistors R14 and R15 provides the correct driving voltage for the LCD display. The circuit segment which includes resistor R13 and capacitor C7 allows processor Vdd to stabilize after a battery change before releasing the processor reset line.

Oscillator Y1, resistor R1, and capacitors C1 and C2 form a low frequency processor and display driver clock. Oscillator Y1 is active all of the time the processor is awake. However, since the frequency is so low, very little power is consumed. Oscillator Y2 comprises a high speed processor clock. This clock is only run when it is necessary to reduce overall power consumption of the circuit.

Resistors R6–R8 provide a method of selecting a particular software program or "personality" without having a separately programmed chip. By selectively populating these resistors, up to 8 different "personalities" can be selected. As used herein, "personalities" refer to desired software programs that can be installed or programmed into the microcontroller U1. In this regard, the microcontroller U1 is capable of storing a number of different software programs that can be used in conjunction with different operation protocols, different fluids, different flow sensors, etc. The program simply reads port 0 to determined which software program or "personality" to activate.

Switches S1 and S3–S5 comprise the operator keypad. These switches are connected to processor port P6 which will initiate an interrupt if the state of any of the port lines change. The processor then reads the port to determine what action to take. The reed switch 30 is connected directly to the INT0 port. Capacitor C3 serves to debounce the reed switch contacts. Both the INT0 port and port 6 have software controlled pull-up resistors built in.

The non-volatile storage for totalizer values and Calibration Factors is provided by NVRAM chip U4. This chip has a 4 wire SSI interface to the microcontroller U1. The use of a 4 wire interface with a separate NVRAM chip allows for lower power dissipation. When the NVRAM chip U4 is deselected, its current is in the microamp range.

Charge pump U2 and associated components, including diodes D1 and D2 and capacitors C5 and C6 make up a voltage doubler. The use of low forward voltage drop schottky diodes are preferred. Diode D3 acts as a one-way switch to power the processor when the charge pump is not running. The oscillator for the charge pump is derived from the 2 Khz buzzer output from the microcontroller U1. This allows the microcontroller complete control of the charge pump. The fixed frequency external oscillator also controls the charge pump's quiescent current which is directly related to oscillator frequency.

A low battery detector is composed of U3 and associated components as depicted. U3 includes a micropower 1.2 volt reference and a micropower comparator. Resistors R10 and R11 provide the comparator with a hysteresis of about 50 mV. Resistors R4 and R5 set the detector threshold at about 2.1 volts.

Transistor Q1 and associated circuitry provide the pulsar output. Q1 is a low threshold device which is capable of sinking about a hundred mA of current. Resistor R12 serves to isolate and protect the remaining circuitry from any high voltages which may make their way to the external connections.

The flow meters of the present invention are preferably made from corrosion resistant materials such as polypropylene, a fluorocarbon such as Viton®, a polyphenylene sulfide such as Ryton®, nylon, or combinations of other plastic materials. The meter body 4 and cap 11 could be made from a conductive material such as aluminum, steel, etc. if the flow meter is to be used to meter flammable fluids such as petroleum. The flow meter of FIGS. 7–10 can be made of a metal, such as aluminum and used to meter the flow of flammable liquids.

Figure 13A:
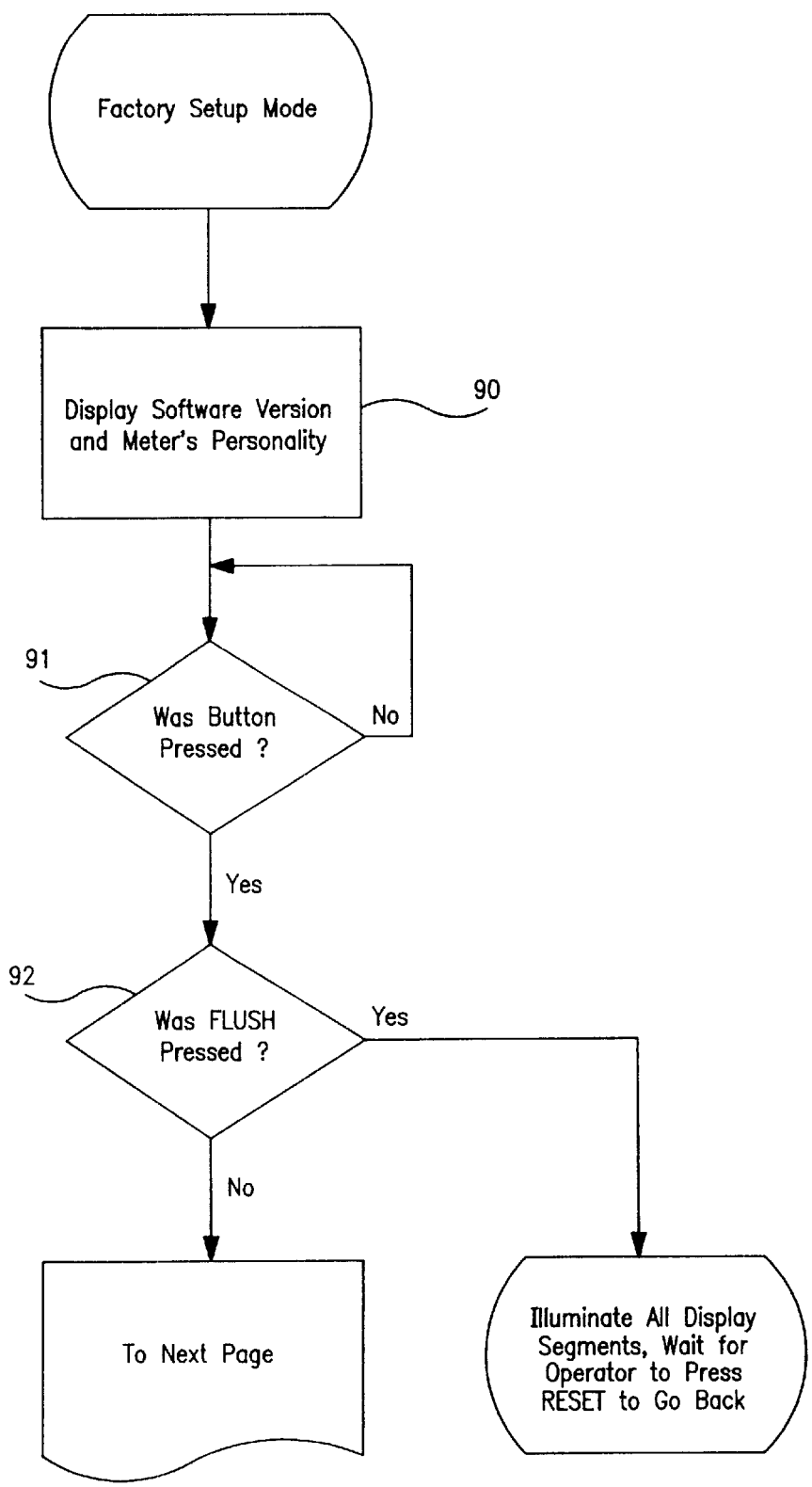
FIGS. 13a–13c comprise a flowchart that illustrates one manner in which the software functions in the FACTORY SETUP Mode.
Figure 13B:
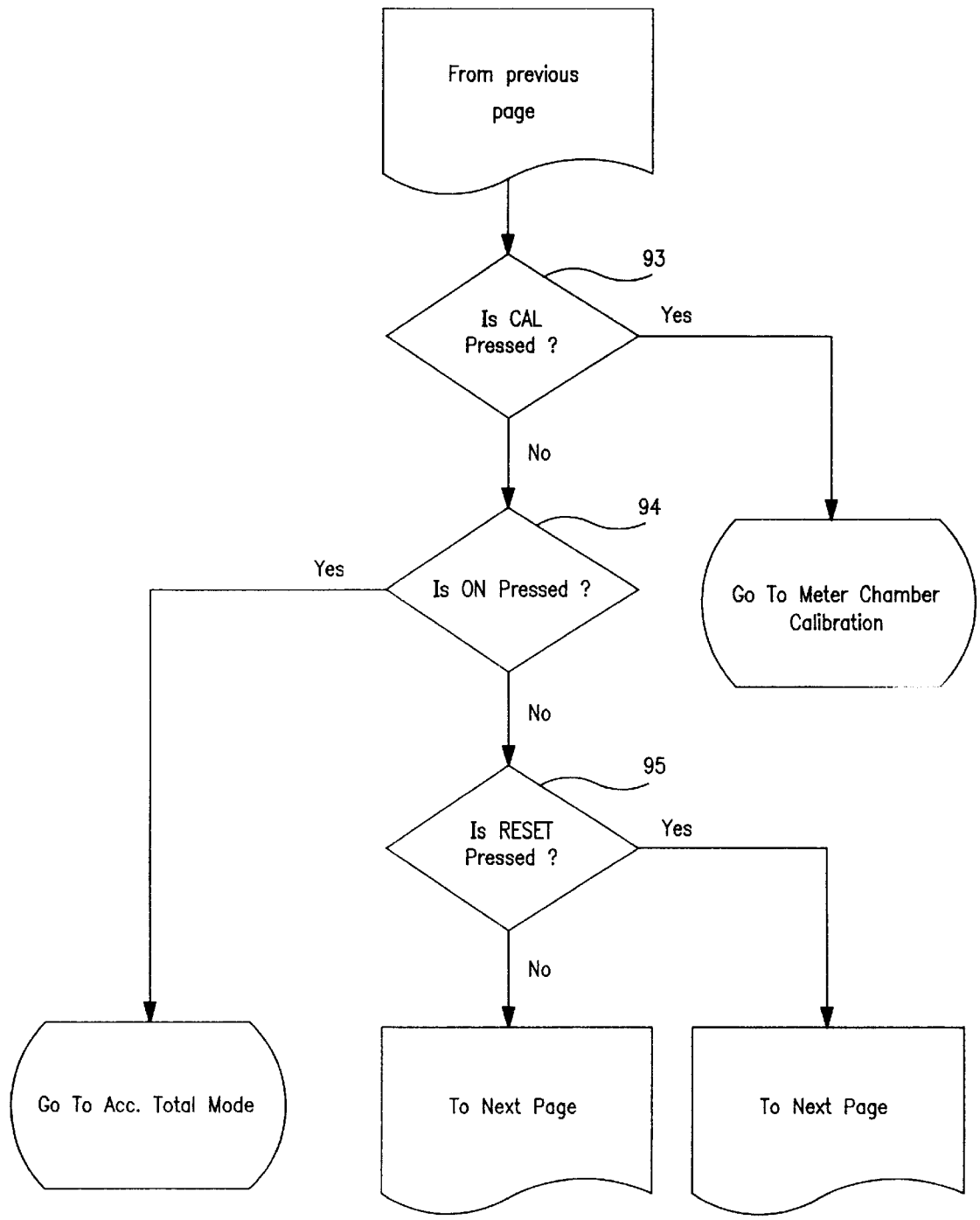
Figure 13C:
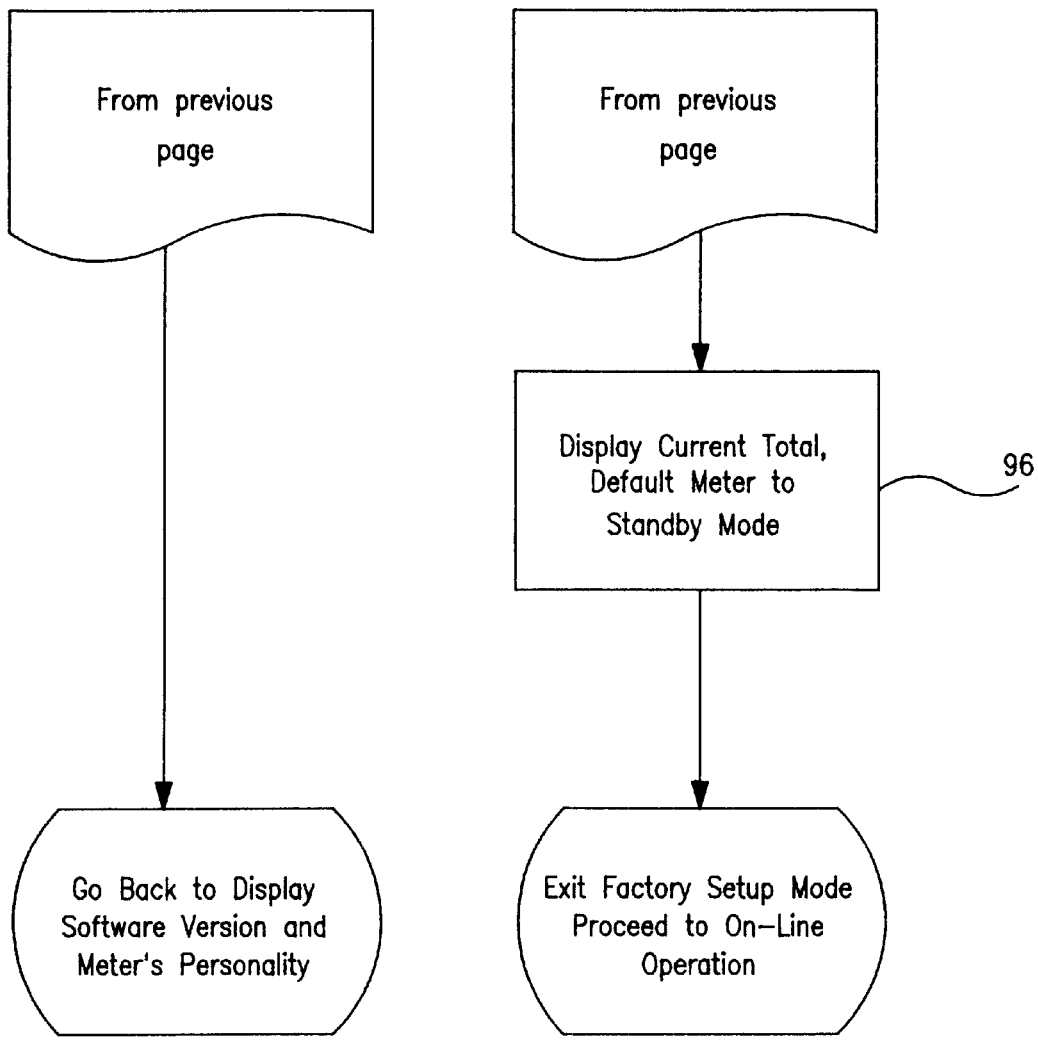

FIGS. 12a–12j collectively show a flow chart which illustrates one example of how software can be implemented to operate the flow meters of the present invention. Block 50 represents a step in which, after the meter is started, the program in the microcontroller clears the RAM and reads the meter's "personality." In the next step represented by block 51 the port lines are setup, the display is turned on and the interrupts are enabled. In the following step indicated by block 52 the verification data from the EEPROM is read and verified. Decision block 53 represents the step of verifying the data. If the data is valid, the stored values are read from the EEPROM into the Ram in a step represented by block 54, and the program proceeds to "On-Line Operation" as indicated in the step represented by block 55. If the data in step 52 is not valid, an error signal is displayed and operation is halted in the step indicated by block 56 so that proper data values can be loaded in the RAM and EEPROM. The next step indicated by decision block 57 checks to determine if the FLUSH and RESET touch pads have been pressed, after which the program proceeds to the FACTORY SETUP Mode which is illustrated in FIGS. 13a–13c.

In the "On-Line Operation," the CURRENT TOTAL volume of fluid that has passed through the flow meter is displayed in the step indicated by block 58 and the meter operation is defaulted to "Sleep" mode. Next, in the step indicated by decision block 59 it is determined whether or not the display needs to be refreshed. If necessary, the display is refreshed in the step indicated by block 60 before proceeding to a step indicated by block 61 in which the timer interrupt is disabled, the M second wake up timer is started, and the meter goes to sleep.

Block 62 represents a step in which the meter is awakened. In a following step indicated by decision block 63, the ½ wake up timer is checked to determine if the meter was awakened by the ½ second timer. If a positive indication results from step 63, then the presence of fluid flow is checked in a step indicated by decision block 64. A negative indication from step 63 causes the program to advance to step 71 which is discussed below. If no fluid flow is detected after 60 seconds in a step indicated by decision block 65, the display is turned off and the meter goes to sleep until started again as indicated in step 66. If fluid flow is detected, a step of determining if 2 seconds have elapsed since fluid flow stopped is conducted as indicated by decision block 67. A positive determination from step indicated 67 results in the saving of CURRENT and ACCUMULATIVE TOTALS in the EEPROM as indicated in the step represented by block 68. The battery voltage is checked in a step indicated by decision block 69 following steps 67 and 68. A determination of low voltage causes a setup flag to flash a battery low signal at 1 HZ as indicated by block 70. In a step represented by block 71 a list of the CURRENT total or battery icon needs to blink or the ON key is pressed and the program determines, in a step represented by decision block 72 if the previous conditions are satisfied. If the previous conditions are not satisfied, the ½ second timer starts and the meter goes to sleep as indicated by block 73. If the previous conditions are satisfied, the meter exits the sleep mode and proceeds processing the incoming pulses from the reed switch or keyed in information in a step indicated by block 74.

After determining that pulses are received in a step indicated by decision block 75, the received pulses are processed into new CURRENT and ACCUMULATIVE TOTALS in a step indicated by block 76. Thereafter, in a step indicated by block 77 the system goes back into its sleep mode. If no pulses are received at step 75, a following step indicated by decision block 78 determines if any key are pressed. If no keys are pressed the system goes into the sleep mode. If any keys are pressed, the program determines if the meter woke up by the ON touch pad in a step indicated by decision block 79. A step of waiting for the ON touch pad to be released occurs at block 80. The program checks to see if the FLUSH and RESET touch pads are pressed in a step indicated by block 81. If the FLUSH and RESET touch pads are pressed the system goes to FACTORY SETUP Mode.

Otherwise, at a step indicated by block 82 the program checks to determine if the ON touch pad is pressed. If the ON touch pad is pressed, the program goes to the display ACCUMULATIVE TOTAL. If the ON touch pad has not been pressed, the program determines at a step represented by block 83 if the CALIBRATION touch pad has been pressed for 3 seconds, in which case the program proceeds to CHANGE CALIBRATION CONSTANT Mode. If the CALIBRATION touch pad has not been pressed for 3 seconds, in a step indicated by decision block 84, the program checks to determine if the FLUSH touch pad has been pressed for 3 seconds, in which case the program proceeds to the FLUSH Mode. If the FLUSH touch pad has not been pressed for 3 seconds, in a step indicated by decision block 85, the program determines if the RESET touch pad has been pressed for 1 second. If the RESET touch pad has been pressed for 1 second, the program proceeds to reset the CURRENT TOTAL and exit to the sleep mode when the RESET touch pad is released. If the RESET touch pad has not been pressed for 1 second, in a step represented by decision block 85, the program determines if any touch pads have been pressed. If no touch pads have been pressed, the system goes to sleep. If any touch pads have been pressed, the program monitors the keys.

FIGS. 13*a*–13*c* comprise a flowchart that indicates one manner in which the software functions in the FACTORY SETUP Mode. In the FACTORY SETUP Mode the software version and meter's personality are displayed in a step indicated by block 90. Next, the program determines whether any touch pads was pressed in a step represented by decision block 91. Once a touch pad has been pressed, the program determines whether the FLUSH touch pad has been pressed in a step represented by decision block 92. If the FLUSH touch pad was pressed, all the display segments are illuminated and the program waits for the operator to press the RESET touch pad. If the decision from block 92 is negative, the program next determines if the CALIBRATION touch pad was pressed in a step identified by decision block 93. If the CALIBRATION touch pad was pressed, the program proceeds to the METER CHAMBER CALIBRATION Mode. If the CALIBRATION touch pad was not pressed, the program proceeds to determine if the ON touch pad was pressed in a step identified by decision block 94. If the ON touch pad was pressed, the program proceeds to the ACCUMULATIVE TOTAL Mode. If the ON touch pad was not pressed the program next determines whether the RESET touch pad was pressed in the step indicated by decision block 95. If the RESET touch pad was not pressed the program displays the software version and the meter's personality. If the RESET touch pad was pressed, the program displays the CURRENT TOTAL in a step identified by block 96, before exiting the FACTORY SETUP Mode and returning to the On-Line Operation.

Figure 14A:
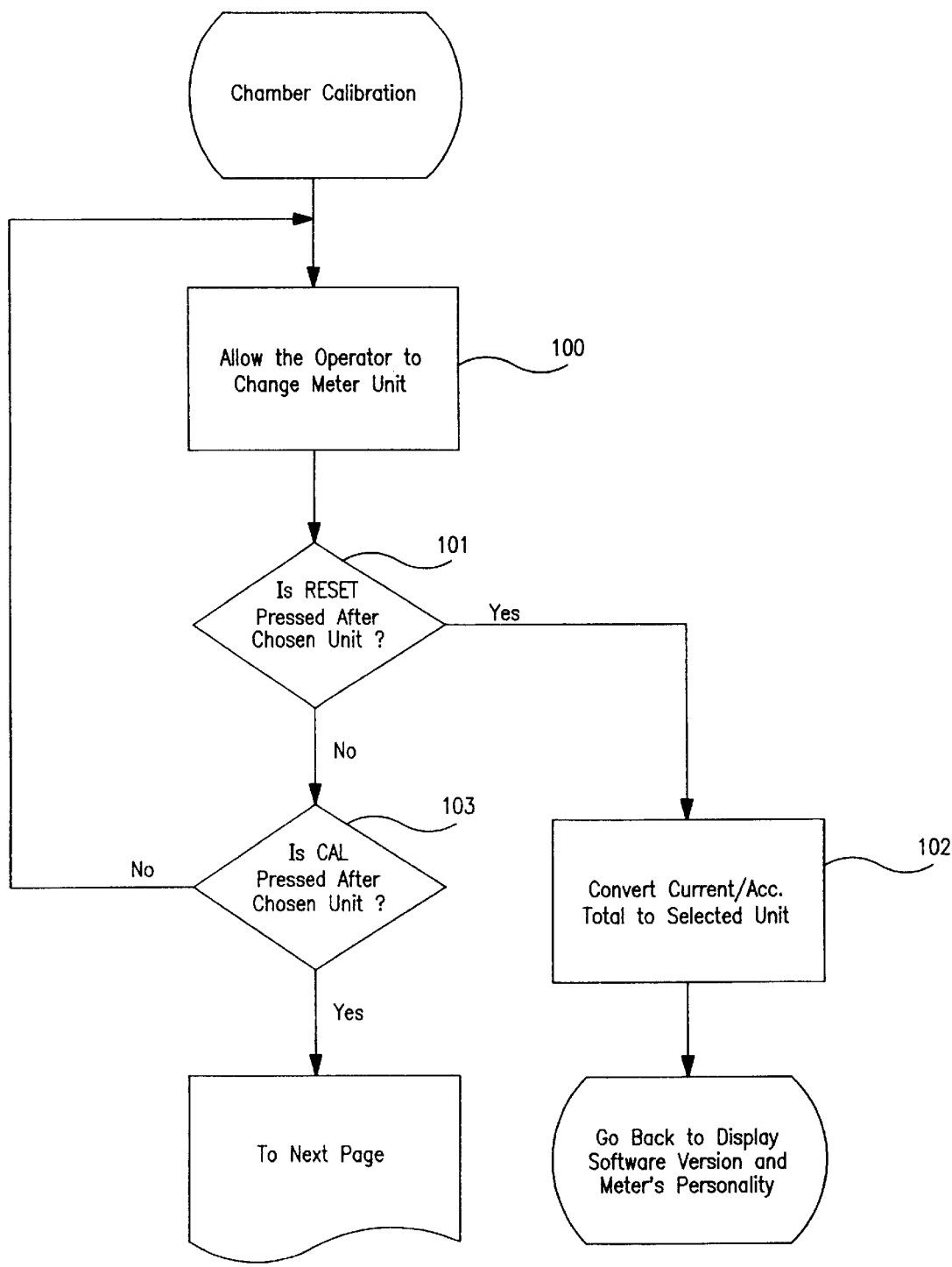
FIGS. 14a–14c comprise a flowchart that illustrates one manner in which the software functions in the CHAMBER CALIBRATION Mode.
Figure 14B:
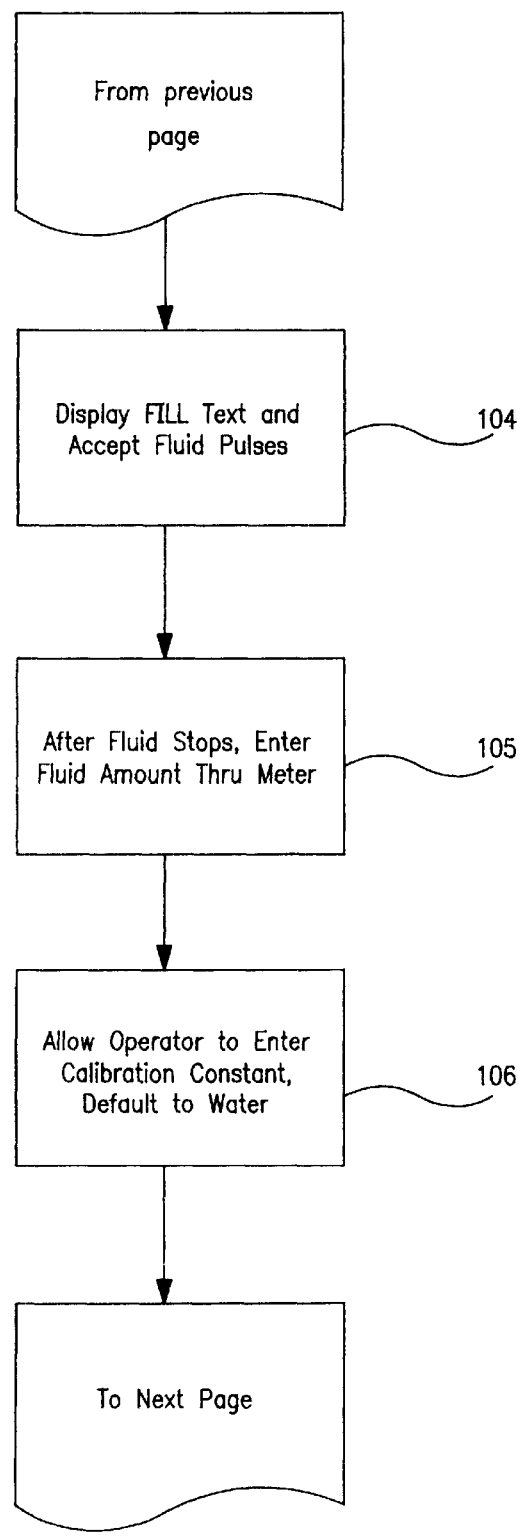
Figure 14C:
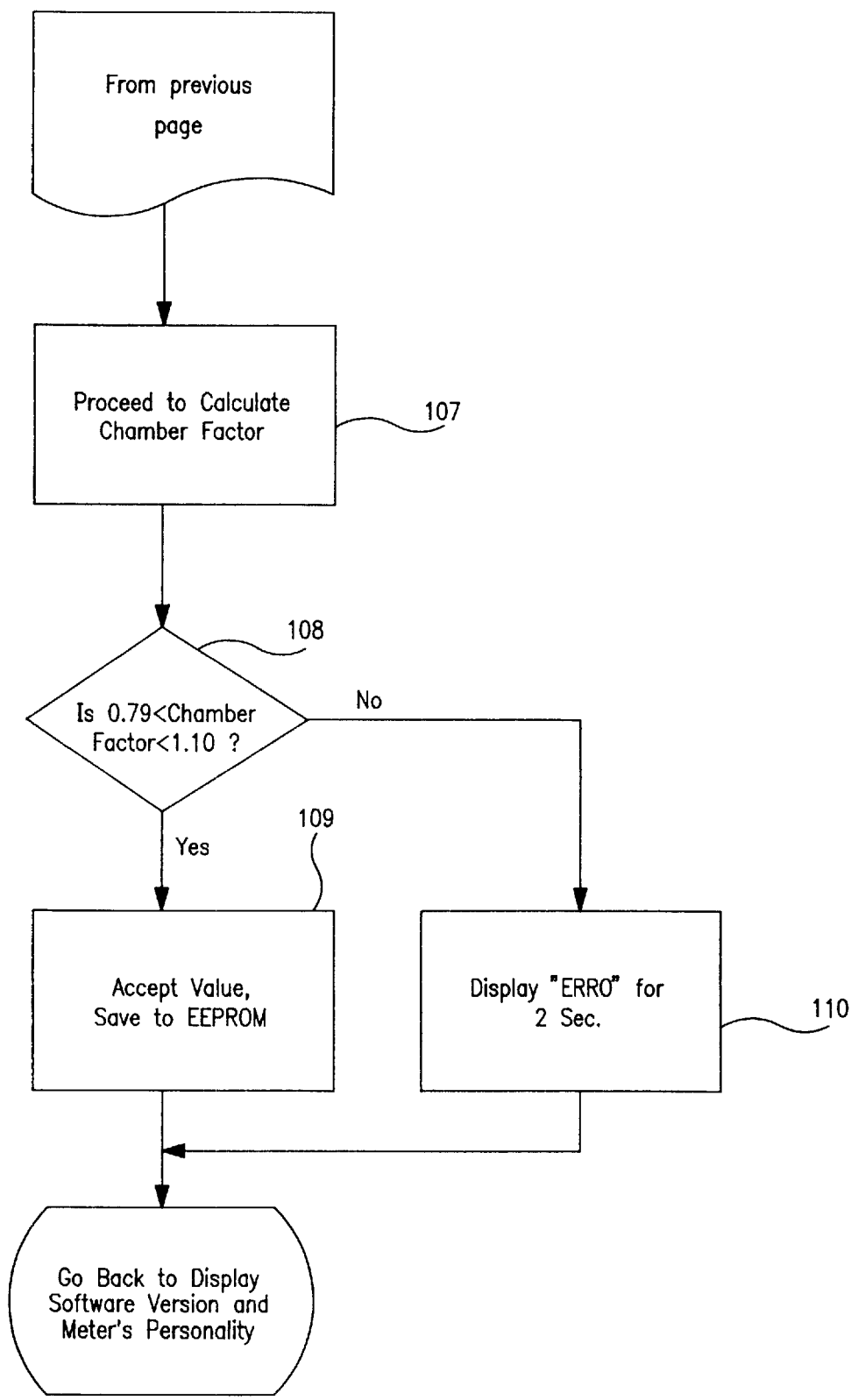

FIGS. 14*a*–14*c* comprise a flowchart that indicates one manner in which the software functions in the CHAMBER CALIBRATION Mode. The CHAMBER CALIBRATION Mode allows the user to change the meter unit in the step identified by block 100. Next, the program determines if the RESET touch pad was pressed in the step identified by decision block 101. If the RESET touch pad was pressed, the program converts ACCUMULATIVE and CURRENT TOTALS to the selected unit in a step identified by block 102, before proceeding to display the software version and personality. If the RESET touch pad was not pressed, the program determines if the CALIBRATION touch pad was pressed in a step identified by decision block 103. If the CALIBRATION touch pad was not pressed the program returns to step 100. If the CALIBRATION touch pad was pressed, the program displays a FILL Text and accepts fluid pulses in the step represented by block 104. After fluid flow stops, the amount of fluid through the meter is stored in a step identified by block 105. Next, in a step identified by block 106, the operator enters a Calibration Factor (or the meter uses a default corresponding to water). The program next calculates the Chamber Factor in the step represented by block 107. The value of Chamber Factor is checked in a step represented by decision block 108. If the Chamber Factor is less than 0.79 or greater than 1.10 an error signal is displayed in a step identified by block 110. If the Chamber Factor is greater than 0.79 less than 1.10 the program accepts the Chamber Factor and saves it in the EEPROM as depicted in the step represented by block 109, before displaying the software version and personality.

Figure 15:
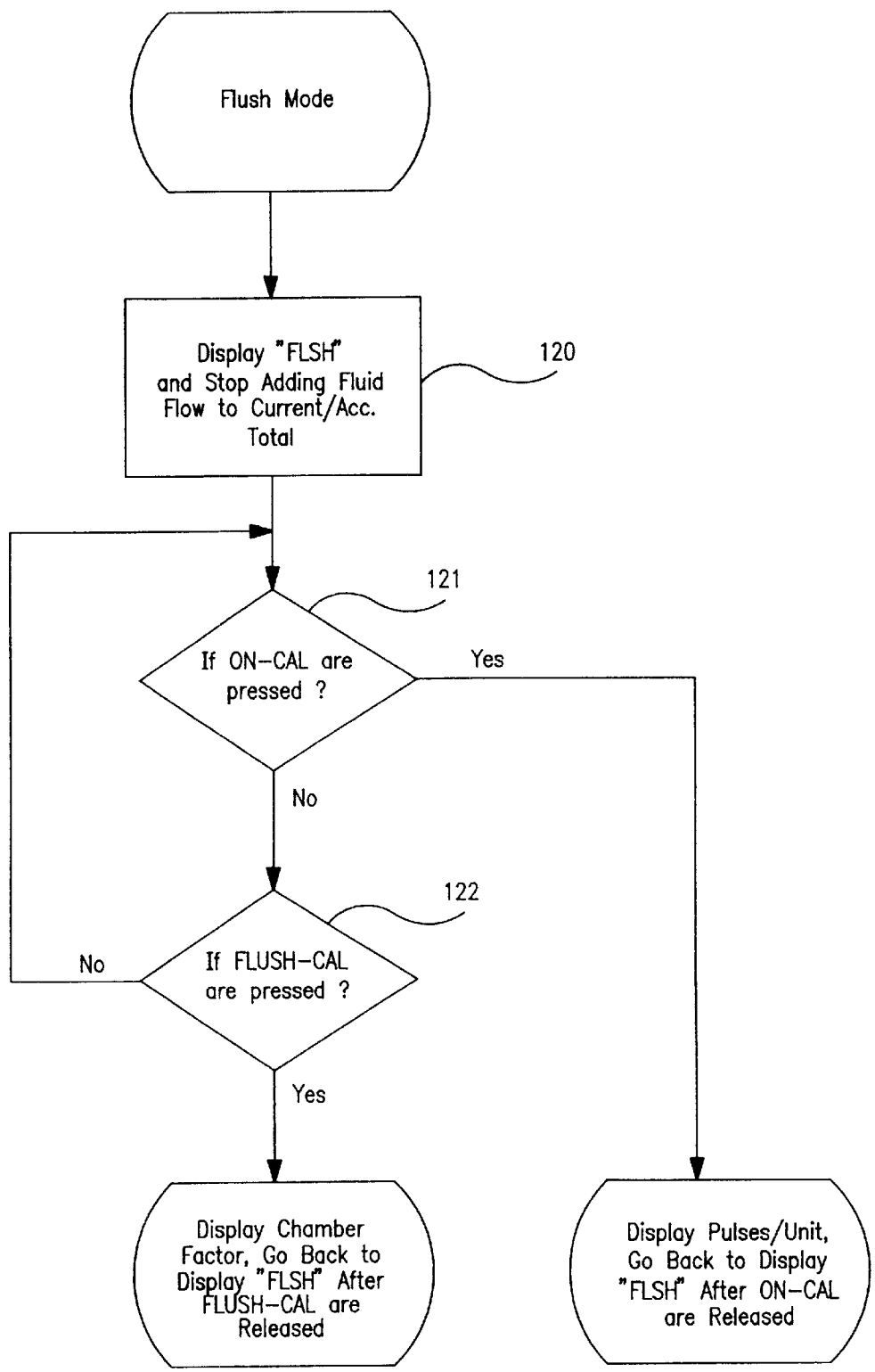
FIG. 15 comprise a flowchart that illustrates one manner in which the software functions in the FLUSH Mode.

FIG. 15 comprises a flowchart that indicates one manner in which the software functions in the FLUSH Mode. In the FLUSH Mode, the program first displays "FLUSH" and stops adding fluid flow to CURRENT and ACCUMULATIVE TOTALS in the step represented by block 120. Next, the program determines if the ON and CALIBRATION touch pads are pressed in a step identified by decision block 121. If the ON and CALIBRATION touch pads are pressed, the program displays pulses per unit and displays "FLUSH" after the ON and CALIBRATION touch pads are released. If the ON and CALIBRATION touch pads are not pressed the program determines whether the FLUSH and CALIBRATION touch pads are pressed in a step identified by decision block 122. If the FLUSH and CALIBRATION touch pads are not pressed, the program returns to step 121. If the FLUSH and CALIBRATION touch pads are pressed, the program displays the Chamber Factor and displays "FLUSH" after the FLUSH and CALIBRATION touch pads are released.

Figure 16A:
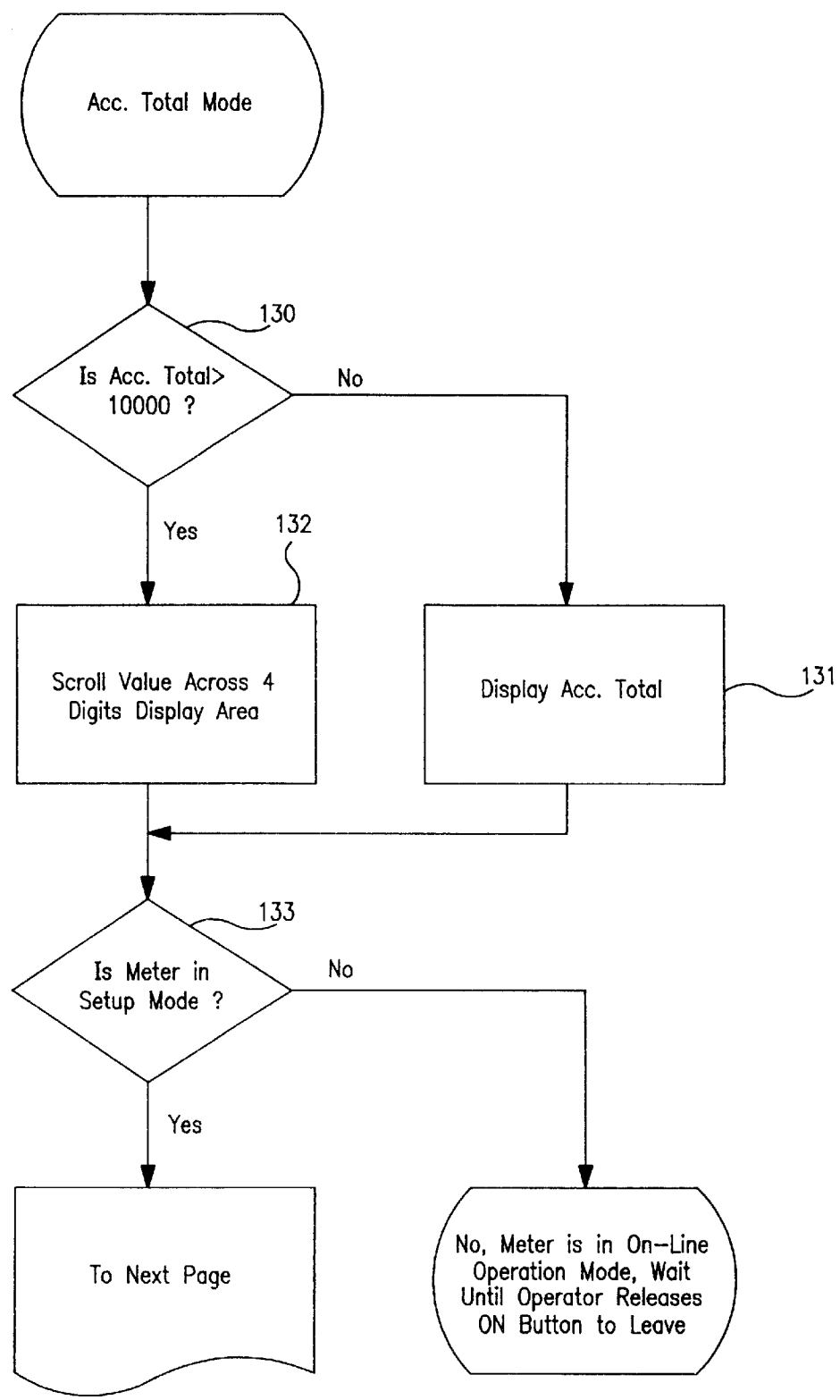
FIGS. 16a–16b comprise a flowchart that illustrates one manner in which the software functions in the ACCUMULATIVE TOTAL Mode.
Figure 16B:
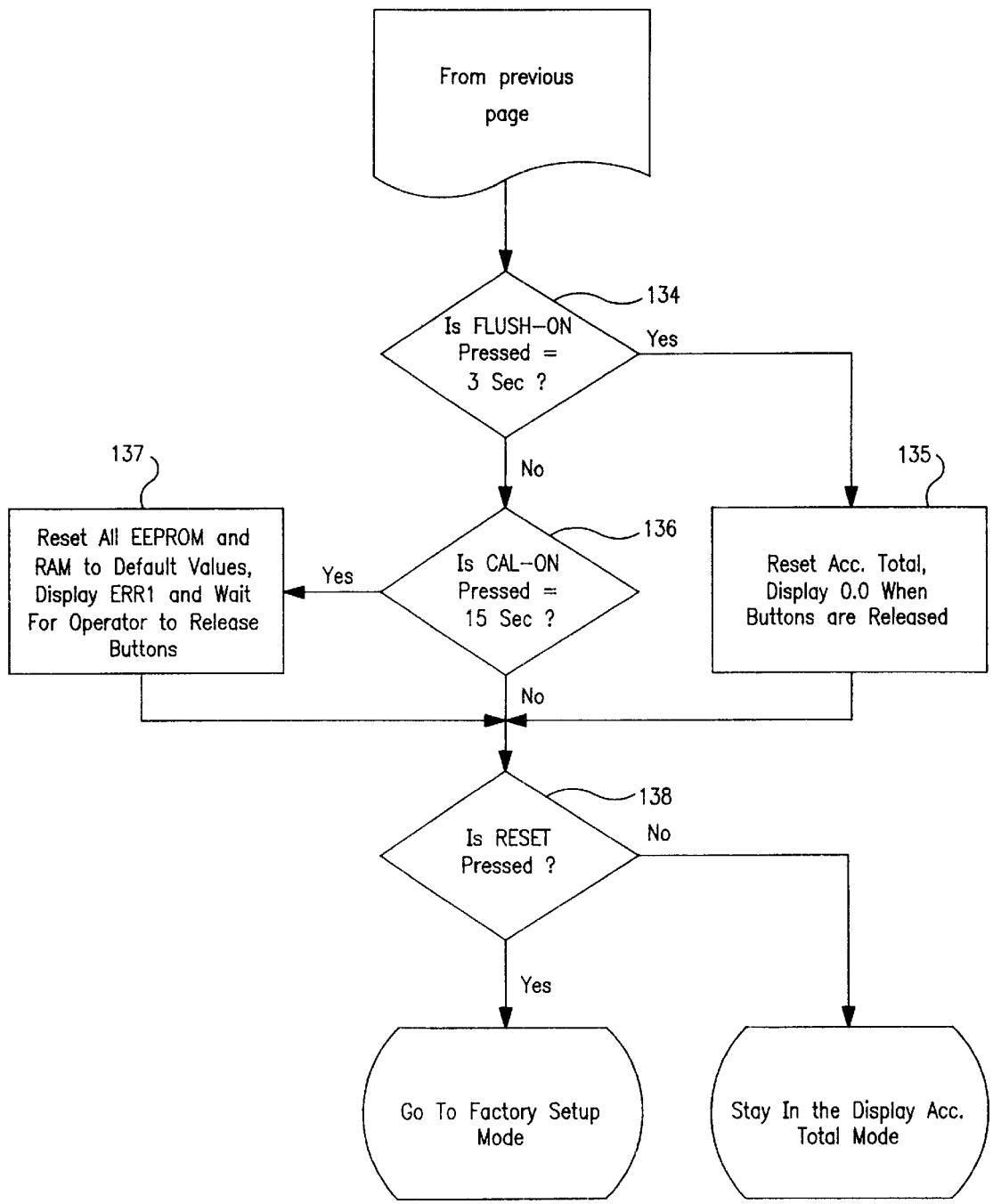

FIGS. 16*a*–16*b* comprise a flowchart that indicates one manner in which the software functions in the ACCUMULATIVE TOTAL Mode. In the ACCUMULATIVE TOTAL Mode, the program first determines if the ACCUMULATIVE TOTAL is greater than 10000 in a step represented by decision block 130. If the ACCUMULATIVE TOTAL is not greater than 10000, the program display the ACCUMULATIVE TOTAL in a step identified by block 132. If the ACCUMULATIVE TOTAL Is greater than 10000, the program displays the ACCUMULATIVE TOTAL in a scrolling manner in the step represented by block 131. After the ACCUMULATIVE TOTAL is displayed, the program determines if the meter is in the SETUP Mode in a step represented by decision block 133. If the meter is not in the SETUP Mode, the meter is in On-Line Operation and the program waits until the ON touch pad is released. If the meter is in the SETUP Mode, the program determines whether the FLUSH and ON touch pads have been pressed for 3 seconds in a step identified by decision block 134. If the FLUSH and ON touch pads are pressed for 3 seconds, the program resets the ACCUMULATIVE TOTAL and displays 0.0 when the FLUSH and ON touch pads are released in a step identified by block 135. If the FLUSH and ON touch pads are not pressed for 3 seconds, the program determines whether the CALIBRATION and ON touch pads are pressed for 15 seconds in a step represented by decision block 136. If the CALIBRATION and ON touch pads have been pressed for 15 seconds the program resets all EEPROM and RAM values to default values and displays an error signal and waits for the operator to release the CALIBRATION and ON touch pads in a step represented by block 137. If the CALIBRATION and ON touch pads have not been pressed for 15 seconds, the program determines whether the RESET touch pad has been pressed in a step represented by block 138. If the RESET touch pad has been pressed the program proceeds to the FACTORY SETUP Mode. If the RESET touch pad has not been pressed the program continues to display the ACCUMULATIVE TOTAL.

The following explains one embodiment of how the flow meter of the present invention can be operated by a user. It is understood that the programming involved is exemplary only and that such other programming schemes can be adapted to various manners of operation of the meter. The electronics module is designed so that the meter is either turned on by pressing the ON/TOTAL touch pad (see FIG. 3) or simply passing fluid through the meter (causing a signal count to be sensed). Once turned on, the meter displays the CURRENT TOTAL units of fluid that have passed through the flow meter. Holding down the ON/TOTAL touch pad will cause the meter to display the total accumulated units of fluid that has passed through the meter (since it was last reset).

The electronics module is designed to turn off the meter over a predetermined period of idle time. This preserves the life of the battery. The electronics module is also designed to maintain storage of the Calibration Factors when the batteries are dead or removed (e.g., for replacement). Also the ACCUMULATIVE TOTAL and CURRENT TOTAL of fluid which has passed through the flow meter are stored.

The Calibration Factor can be selected by pushing the CALIBRATE touch pad (see FIG. 3). Each time the CALIBRATE touch pad is pressed and held briefly it toggles through the Calibration Factors. Pressing the RESET touch pad (FIG. 3) will reset the CURRENT TOTAL to zero.

Pressing the NO COUNT FLUSH touch pad will allow the user to run fluid through the meter without adding to either the CURRENT TOTAL or the ACCUMULATIVE TOTAL. Thereafter pressing the RESET touch pad will cause the meter to return to its normal operating mode.

Figure 17A:
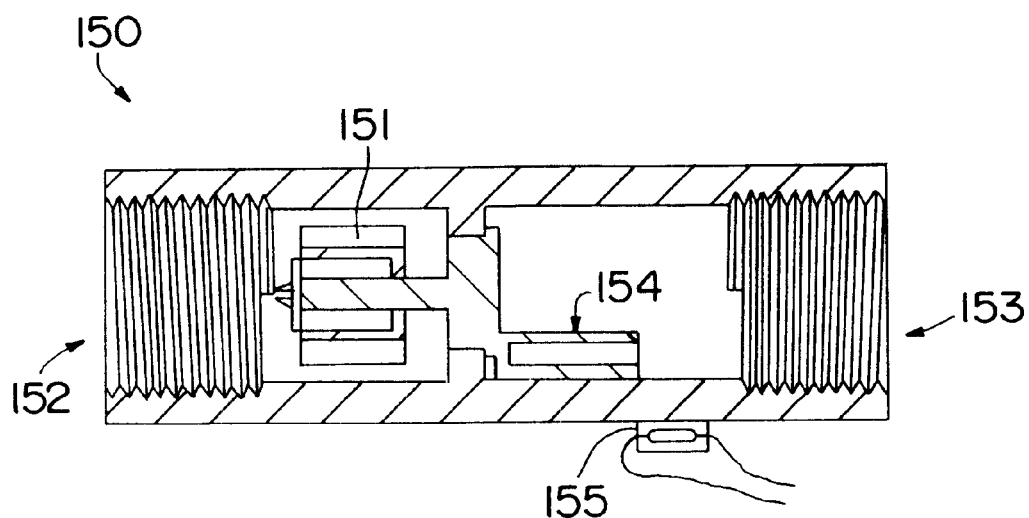
FIGS. 17a and 17b are sectional views of an air flow compensator according to one embodiment of the present invention that can be used in conjunction with the flow meters the present invention.
Figure 17B:
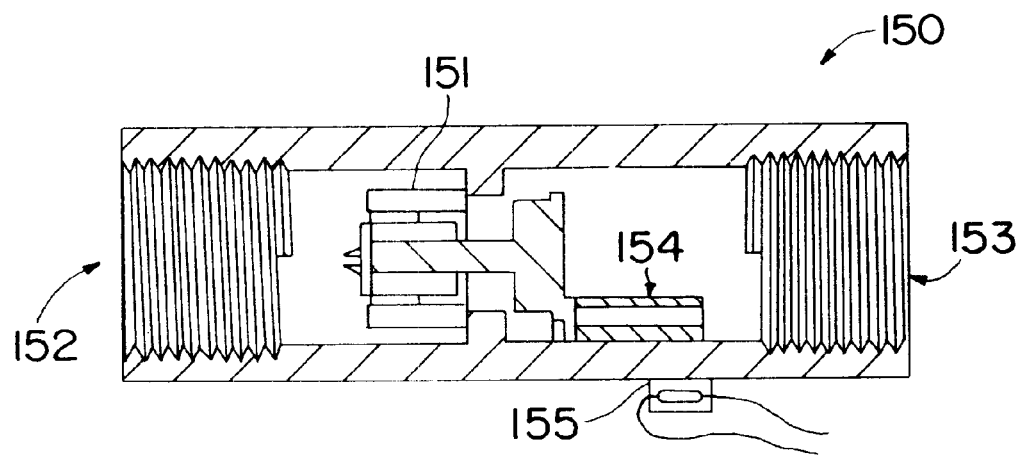

According to the present invention, the flow meter can be used in conjunction with air flow compensators which will prevent false readings caused by the flow of air through the flow meter. False readings are likely to occur when pumping procedures are initiated and there is air in the lines. Such false readings can result in errors in total and accumulated values calculated and stored by the flow meter. FIGS. 17*a* and 17*b* are sectional views of an air flow compensator according to one embodiment of the present invention that can be used in conjunction with the flow meters the present invention. The air flow compensator 150 in FIGS. 17*a* and 17*b* comprises a length of pipe that includes an internal valve element 151 or shuttle. The valve element 151 or shuttle is normally biased in the closed position depicted in FIG. 17*a* by a spring member in a conventional manner. When a liquid flows through the air flow compensator 150 through inlet 152 and out outlet 153, the valve element 151 or shuttle moves from the closed position depicted in FIG. 17*a* to an open position depicted in FIG. 17*b*. The air flow compensator 150 includes a magnet 154 that is coupled to the valve element 151 or shuttle. The magnet 154 cooperates with a reed switch 155 which is located within or on the wall of the air flow compensator 150. The reed switch 155 is positioned so that it is activated when the magnet 154 moves with the valve element 150 or shuttle. That is, when the valve element 150 or shuttle moves to the open position depicted in FIG. 17*b*, the magnet 154 causes the reed switch 155 to operate (open or close). The air flow compensator 150 includes threaded structure on at least one end thereof by which it can be coupled to a flow meter according to the present invention. When the air flow compensator 150 is coupled to a flow meter, the opening or closing of the reed switch 155 can be used to enable (or disable) the counting of the pulses from reed switch 30 which are used by the flow meter to measure fluid flow through the meter. The valve element 150 has a sufficient mass and is otherwise biased sufficiently enough so that it does not move the magnet 154 enough to activate reed switch 155 when air or other gaseous fluids pass through the air flow compensator 150. Thus, the air flow compensator 150 can be used to distinguish between liquid and gas flow and appropriately activate the pulse counter of the flow meter. It is noted that a perimeter switch or other sensing device could be used in the air flow compensator 150 in place of the magnet/reed switch configuration. It is also noted that the air flow compensators of the present invention can be used separately from the present flow meters.

Figure 18:
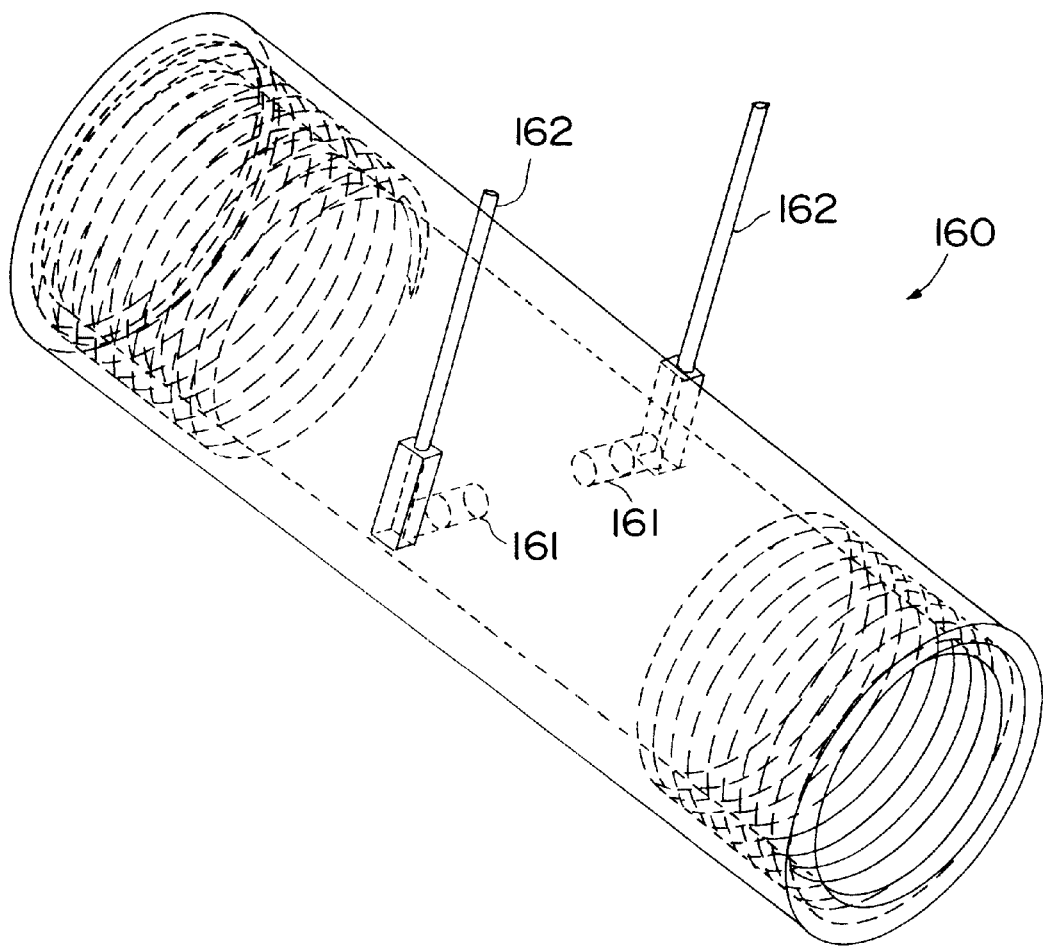
FIG. 18 is a perspective view of another embodiment of an air flow compensator.

FIG. 18 is a perspective view of an air flow compensator according to another embodiment of the present invention that can be used in conjunction with the flow meters of the present invention. The air flow compensator 160 in FIG. 18 comprises a length of pipe that includes a pair of electrical probes 161 which can be used to detect electrical conductivity of a fluid which passes between the electrical probes. The electrical probes 161 can be connected by leads 162 to any conventional circuitry which detects electrical continuity. The presence of fluids such as liquids which are conductive can be detected by the air flow compensator of FIG. 18. Gaseous fluids such as air are not sufficiently conductive to be detected. Thus, the lack of detection of continuity during a fluid transfer process indicates that air or some other gas is present in the fluid line. The detection of continuity or lack thereof, using the air flow compensator of FIG. 18 can be used to enable the counting of the pulses from reed switch 30 which is used by the flow meters of the present invention to measure fluid flow through the meter. In addition to continuity, the electrical probes 161 can be used to measure other electrical properties of fluids such as the capacitance of a fluid therebetween.

Although the electrical probes 161 are depicted as opposing each other on opposite sides of the air flow compensator 160, it is possible to have the electrical probes 161 positioned at any location so long as they are spaced apart and in contact with any fluid that passes through the air flow compensator 160. The electrical probes 161 are not limited to the shape show in FIG. 18. In this regard, they can comprise straight or curved elongated elements that are axially aligned with the central axis of the air flow compensator 160.

FIGS. 19–33 are directed to precalibrated flow meters having air flow compensators incorporated therein. Many of the components of the precalibrated flow meters depicted in FIGS. 19–33 are similar to the corresponding components of the precalibrated flow meter depicted in FIGS. 1–5. Accordingly, common reference numerals are used for corresponding components and a detailed description is only provided for components which are not described above.

Figure 19:
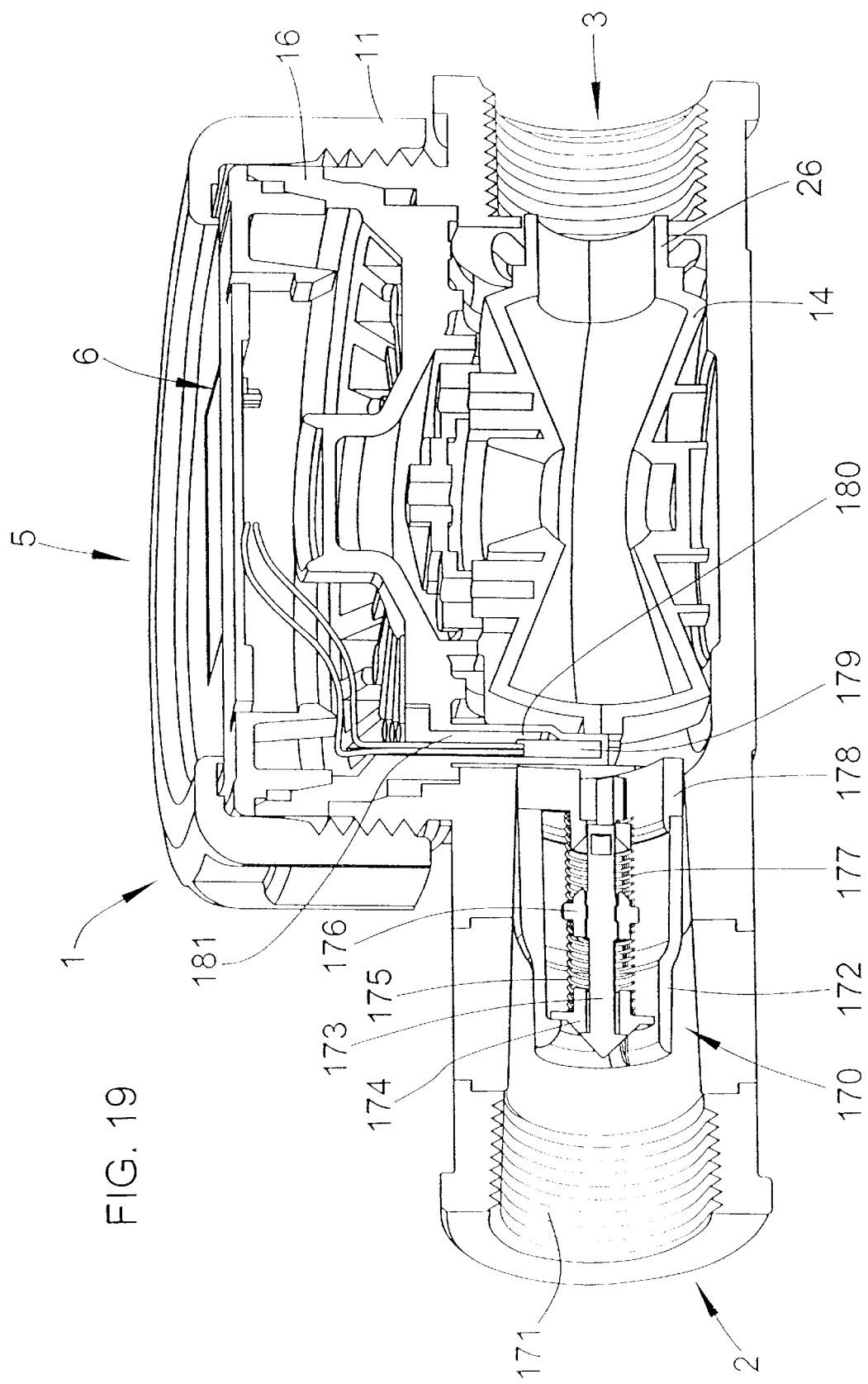
FIG. 19 is a cross-sectional view of a flow meter that has a housing with an air flow compensator incorporated therein.

FIG. 19 is a cross-sectional view of a precalibrated flow meter that has a housing with an air flow compensator incorporated therein. The flow meter of FIG. 19 includes an extended inlet 2 having a length which is sufficient to receive an air flow compensator assembly 170 according to the present invention. The inlet 2 can include an internal threaded end 171 or other conventional coupling structure for connecting the flow meter to a source of liquid to be metered. The air flow compensator assembly 170 includes a cartridge body 172 which houses a main slide 173, secondary slide 174 secondary spring 175, spring stop 176, and primary spring 177. A support arm 178 is coupled to the downstream end of the cartridge body 172 and used to align the air flow compensator assembly 170 in the inlet 2 of the flow meter 1.

In addition to the air flow compensator assembly 170, FIG. 19 depicts a proximity sensor 179 which is received in a proximity sensor chamber 180 and held in position by a proximity sensor holder 181. The air flow compensator of the FIGS. 19–33 utilizes a magnetic reed switch as the proximity sensor. The magnetic reed switch it placed in proximity sensor chamber 180 and secured therein by proximity sensor holder 181 which can be used to push and hold the magnetic reed switch into position.

FIG. 20 is a cross-sectional view of the air flow compensator assembly of FIG. 19. FIG. 20 shows how the various components of the air flow compensator assembly are arranged. The secondary slide 174 secondary spring 175, spring stop 176 and primary spring 177 are each arranged on the main slide 173. The main slide 173 includes a tapered, cone-shaped head 185 at its upstream end which defines a stepped portion 186 against which an upstream end 187 of the secondary slide 174 abuts under the bias force of secondary spring 175. The downstream end of main slide 173 is provided with a magnet insert 275. The secondary slide includes a central bore 188 with an inner diameter that is slightly larger than the outer diameter of the main slide 173. The upstream end of the secondary slide 174 includes a tapered portion 189 formed at the same angle as the tapered or cone-shaped head 185 of the main slide 173. In alternative embodiments the tapered portion 189 of the secondary slide 174 and the tapered or cone-shaped head 185 of the main slide 173 can have different angular shapes.

The secondary slide 174 includes a flange 190 having a diameter that is large enough to abut against inward abutment projections 191 formed on the inner surface of the cartridge body 172 at the upstream end thereof. The abutment of flange 190 against abutment projections 191 retains the air flow compensator assembly 170 in the cartridge body 172.

The main slide 173 has a seat 192 that is defined by a reduced outer diameter portion as shown. The spring stop 176 includes a central bore 193 with a decreased inner diameter portion 194 which is configured to be received in seat 192 when spring stop 176 is press-fit onto main slide 173. The use of a press-fit configuration of spring stop 176 and main slide 173 allows for convenient assembly of the air flow compensator assembly. In alternative embodiments, the spring stop 176 can be fixed in position on main slide 173 by any conventional means, including pins, threaded connections, glues, cements, etc.

Spring stop 176 has a stepped shape that includes a central portion 195 having an outer diameter that is larger than the outer diameter of both the upstream end 196 and the downstream end 197. The stepped shape of the spring stop 176 defines opposed radial abutting surfaces 198 and 199 that are configured to engage ends of both the secondary spring 175 and the primary spring 177 as illustrated.

The arm support 178 includes an annular structure 200 that projects in the upstream direction. The annular structure 200 has an outer diameter that is configured to receive the downstream end of primary spring 177 thereon. The inner diameter of the annular structure 200 is configured to receive the downstream end of main slide 173 therein.

As mentioned above, the arm support 178 is coupled to the downstream end of the cartridge body 172. The support arm 178 includes a cylindrical body portion 201, the annular structure 200 discussed above, and an alignment structure 202 which extends from the downstream end of the arm support 178. The alignment structure 202 is configured to be received in a complimentary shaped seat provided in meter body 4 in alignment with the inlet 2. According to one embodiment of the present invention, the alignment structure 202 includes a pair of wings 203 which are angled inwardly (See FIG. 28), and the meter body 4 is provided with complimentary angled walls (not shown) that project inwardly from the inner wall of the meter body 4. The wings 203 of the alignment structure are received between the angled walls that project inwardly from the inner wall of the meter body 4.

FIG. 20 shows arm support 178 having a stepped diameter portion 204 on the upstream end. This stepped diameter portion 204 which can comprise discrete segments as depicted, is used to couple the arm support 178 and cartridge body 172 together. In this regard the stepped diameter portion 204 of the arm support 178 can be received in the downstream end of cartridge body 172 and secured therein by sonic welding, gluing or any other convenient manner.

FIG. 21 is an exploded view of the air flow compensator assembly of FIG. 20. The air flow compensator assembly is assembled by positioning the secondary slide 174, secondary spring 175, spring stop 176 and primary spring 177 on the main slide 173 in the order shown. As seen perhaps more clearly in FIG. 21, the seat 192 provided on the main slide 173 which receives spring stop 176, is formed by including two spaced apart built-up portions 205 and 206 with the downstream built-up portion 206 being tapered so as to aid in press-fitting spring stop 176 thereover and into the intermediate reduced diameter portion which defines seat 192.

Figure 22:
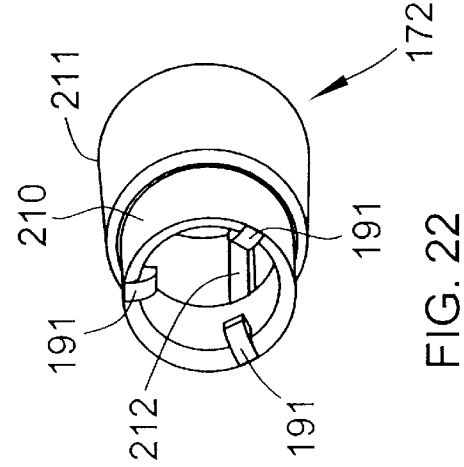
FIG. 22 is a perspective view of cartridge body according to one embodiment of the present invention that depicts the internal structure of the cartridge body.

FIG. 22 is a perspective view of cartridge body according to one embodiment of the present invention that depicts the internal structure of the cartridge body. The wall of the cartridge body 172 has a smooth stepped shape with a smaller diameter portion 210 upstream of a larger diameter portion 211 (see FIG. 20). The inner surface of the wall has a corresponding smooth stepped portion. In addition, the inner surface of the wall is provided with alignment projections 212 that are symmetrically spaced apart along the circumference of the inner surface of the wall and extend longitudinally. As depicted, the alignment projections 212 have a height which is equal to the difference in the inner diameters of the smaller and larger portions 210, 211 of the wall of the cartridge body 172.

The inward abutment projections 191 formed on the inner surface of the cartridge body 172 at the upstream end are equal in number to the alignment projections 212 and depicted as being axially aligned with the alignment projections 212. In order to limit resistance to fluid flow through the air flow compensator, three equally spaced apart abutment projections 191 and alignment projections 212 are used. In other embodiments more than three abutment projections 191 and alignment projections 212 can be used.

The upstream end of the cartridge body 172 has a curved or beveled shape (See FIG. 20) which is designed to limit resistance to fluid flow therethrough.

Figure 23:
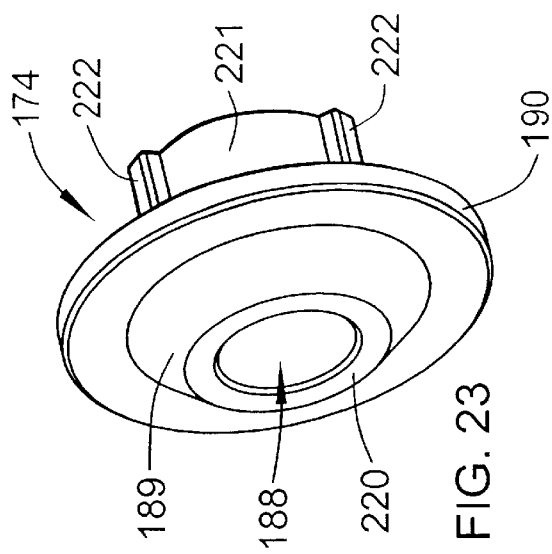
FIG. 23 is a front perspective view of a secondary slide according to one embodiment of the present invention.

FIG. 23 is a front perspective view of a secondary slide according to one embodiment of the present invention. The secondary slide 174 includes flange 190 and a tapered portion 189 which projects upstream from flange 190. The tapered portion 189 terminates at a flat end 220 having a diameter which is approximately equal to the diameter of the stepped portion 186 of the tapered, conical-shaped head 185 of the main slide 173 (see FIG. 20).

Figure 24:
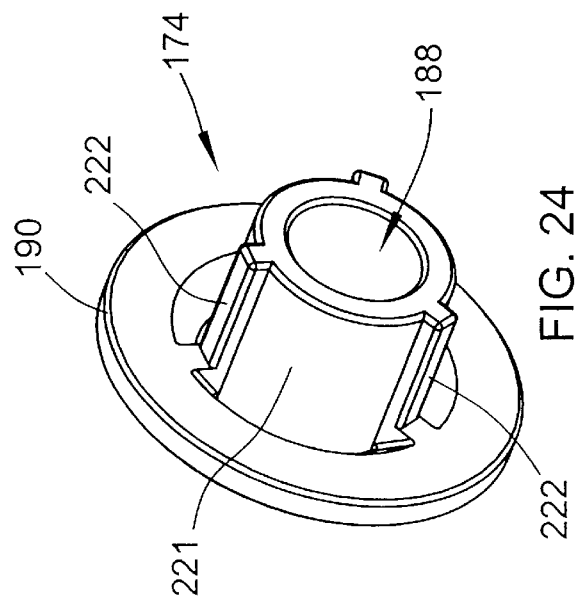
FIG. 24 is a rear perspective view of the secondary slide of FIG. 23.

FIG. 24 is a rear perspective view of the secondary slide of FIG. 23. The secondary slide 174 includes a cylindrical body 221 which extends downstream of the flange 190. The cylindrical body 221 can be provided with reinforcing ribs 222 which extend axially along the outer surface thereof. As shown in FIG. 20 the secondary slide 174 has a central bore 188 therethrough which has an inner diameter that is slightly larger than the two spaced apart built-up portions 205 and 206 on the main slide 173.

Figure 33:
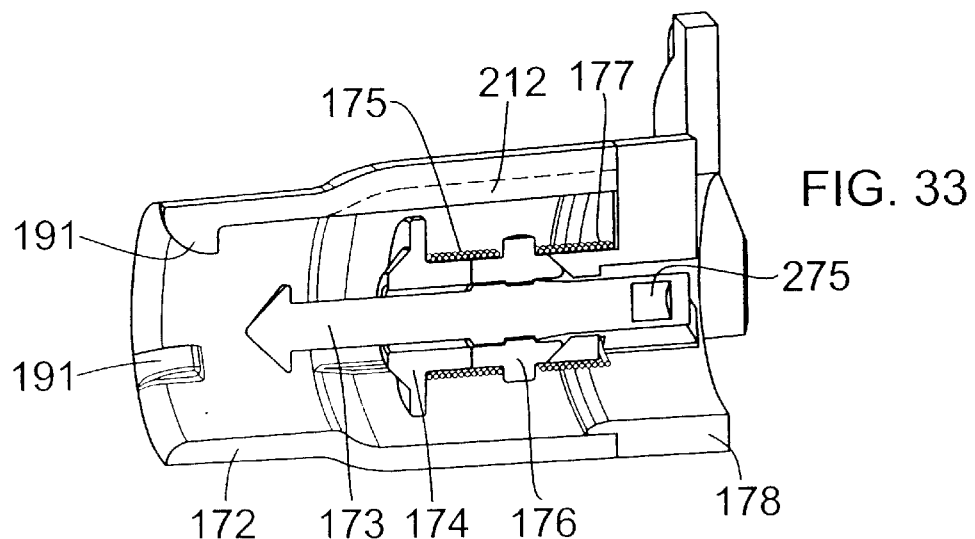
FIG. 33 is cross-sectional view of an air flow compensator according to the present invention illustrating the effect of a large liquid flow therethrough.

FIG. 25 is front perspective view of a spring stop according to one embodiment of the present invention. FIG. 26 is a rear perspective view of the spring stop of FIG. 25. The spring stop 176 includes a flange 230 and two cylindrical portions 231 and 232 which extend in opposite axial directions from each side of the flange 230. Rib structures 233 can be provided on the cylindrical portions 231, 232 and on either sides of the flange 230 to increase strength while reducing the weight of the spring stop 176. The upstream cylindrical portion 231 is depicted as having a flat end 234. The downstream cylindrical portion 232 is depicted as having a tapered end 235. As depicted in FIG. 33, the flat end 234 of the upstream cylindrical portion 231 is designed to mate compatibly with the flat downstream face of the secondary slide 174, and the tapered end 235 of the downstream cylindrical portion 232 is configured to mate compatibly with the inward tapered end of the annular cylindrical structure 200 of the arm support 178.

FIG. 27 is a front perspective view of an arm support according to one embodiment of the present invention. FIG. 28 is a rear perspective view of the arm support of FIG. 27. The arm support 178 includes a cylindrical body portion 201 with a U-shaped flange 250 on a downstream end which is perpendicular to the axis of the cylindrical body portion 201. The U-shaped flange 250 includes a pair of wings 203 located on either leg 251 of the U-shaped flange 250. The wings 203 are angled inward as shown.

The upstream sides of the legs 251 of the U-shaped flange 250 include cut-out portions 252 which are configured to be received in complimentary shaped projections formed in the side wall of the meter body (not shown). When they engage the complimentary shaped projections formed in the side wall of the meter body, the cut-out portions 252 secure the arm support 178 and air flow compensator assembly 170 in proper position.

The gap 253 between the legs 251 of the U-shaped flange 250 is designed to receive the proximity sensor 179, e.g., the magnetic reed switch as depicted in FIG. 19.

Figure 31:
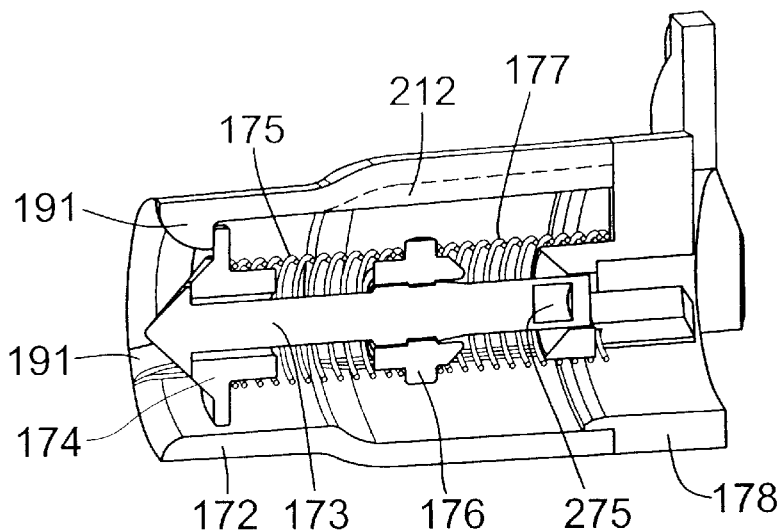
FIG. 31 is cross-sectional view of an air flow compensator according to the present invention illustrating the effect of a minimum liquid flow therethrough.
Figure 32:
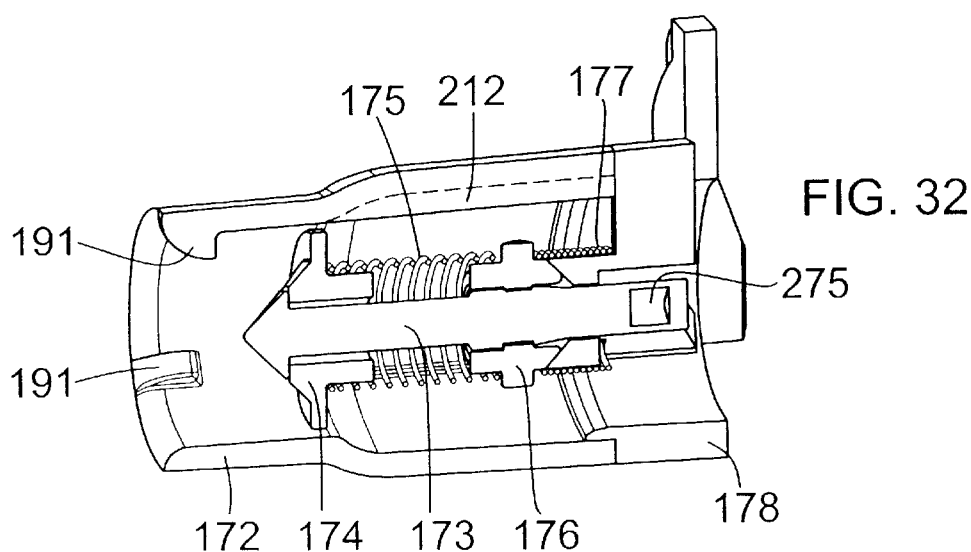
FIG. 32 is cross-sectional view of an air flow compensator according to the present invention illustrating the effect of a moderate liquid flow therethrough.

The cylindrical body portion 201 includes a central through-bore 254 which extends through u-shaped flange 250. A plurality of alignment fins 255 project radially inward from the inner surface 256 of central through-bore 254. The free ends of the alignment fins 255 have radially curved shapes and are spaced apart so as to define a central opening that has a diameter which is slightly larger than the diameter of the main slide 173. The central opening defined by the free ends of the alignment fins 255 receive and guide axial movement of the main slide 173 as depicted in FIGS. 31–33.

The arm support 178 includes annular structure 200 which is fixed to the plurality of alignment fins 255 and projects out from the upstream end of the cylindrical portion 201 of the arm support 178. The upstream end of the annular structure 200 has a tapered shape as best shown in FIGS. 20 and 30–33.

Figure 29:
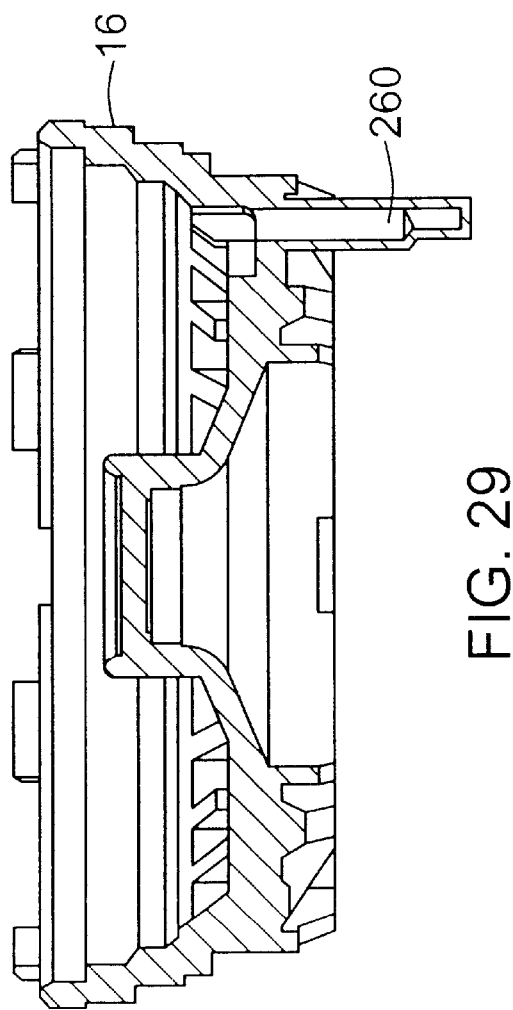
FIG. 29 is a cross-sectional view of a meter cover that includes a proximity sensor chamber.

FIG. 29 is a cross-sectional view of a meter cover that includes a proximity sensor chamber. The meter cover 16 of the embodiment of the invention depicted in FIGS. 19–33 differs from the meter cover depicted in FIGS. 1–4 by the inclusion of a proximity sensor chamber 260 which is a cylindrical chamber that extends downward from the meter cover 16 as depicted. The proximity sensor chamber 260 is positioned to be received in the gap 253 between the legs 251 of the u-shaped flange 250 of the arm support 178 when the precalibrated meter is assembled. It is to be understood that the proximity sensor can be other than cylindrically shaped.

Figure 30:
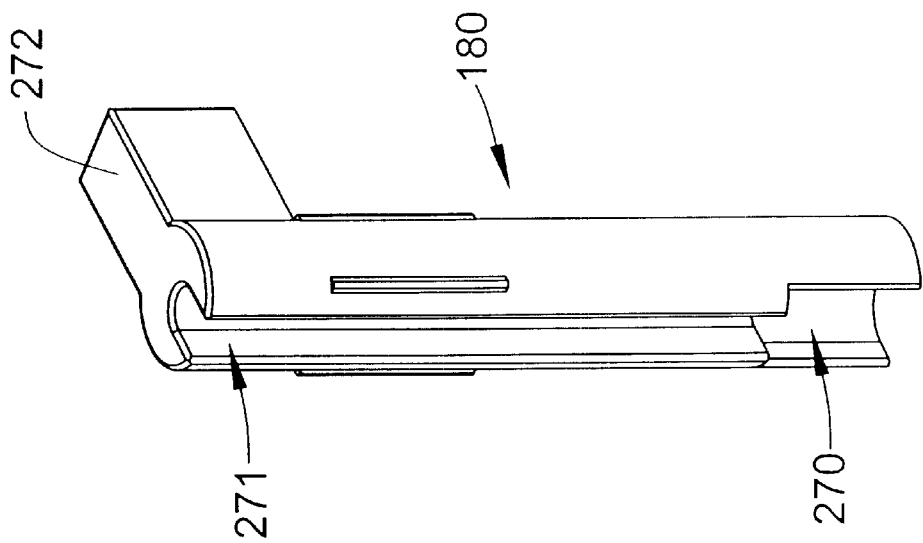
FIG. 30 is a perspective view of a proximity sensor holder according to one embodiment of the present invention.

FIG. 30 is a perspective view of a proximity sensor holder according to one embodiment of the present invention. The proximity sensor 179, e.g., magnetic reed switch is received in the proximity sensor chamber 260 and pushed and help in place by the proximity sensor holder 180. Accordingly, the proximity sensor holder 180 has a cylindrical cross sectional shape that is configured to be received in the proximity sensor chamber 260. The proximity sensor holder 180 includes a seat 270 at the distal end thereof for engaging and holding the proximity sensor 179 in position at the bottom of the proximity sensor chamber 260. The proximity sensor holder 180 also includes a channel 271 through which leads for the proximity sensor 179 can pass. Although channel 271 is shown as being formed in the side of the proximity sensor holder 180, it is also possible to provide the proximity sensor holder 180 with an internal channel. The proximal end of the proximity sensor holder 180 includes a stop 272 which is configured to be received in a complimentary shaped recess adjacent the top of the proximity sensor chamber 260 as shown in FIG. 19.

The air flow compensator is designed to operate, i.e, detect the flow of air, without inhibiting the flow of liquid therethrough.

FIG. 31 is cross-sectional view of an air flow compensator according to the present invention illustrating the effect of a minimum liquid flow therethrough. The air flow compensator assembly 170 will only allow a minimum flow, e.g. 0.0–1.5 gpm, of liquid to slip through without affecting movement of the main slide 173 as depicted in FIG. 31. The fluid that slips through the air flow compensator assembly 170 in FIG. 31 follows the path identified by arrow "a" in FIG. 20.

FIG. 32 is cross-sectional view of an air flow compensator according to the present invention illustrating the effect of a moderate liquid flow therethrough. A moderate flow, e.g. 1.5–2.0 gpm, of liquid will overcome the force of primary spring 177 and cause the main slide 172 to move downstream so that the downstream end of the main slide 173 moves toward the proximal sensor 179 (see FIG. 19) as depicted in FIG. 32. The downstream end of the main slide 173 is provided with a magnet insert 275 that will trigger the magnetic switch, thereby sending an appropriate signal to the electronics module 18.

FIG. 33 is cross-sectional view of an air flow compensator according to the present invention illustrating the effect of a large liquid flow therethrough. A large flow, e.g. greater than 2.0 gpm, of liquid will overcome the force of secondary spring 175 and cause the secondary slide 174 to move downstream so that the secondary slide 174 enters the portion of the cartridge body 172 that has a greater inside diameter. Once the secondary slide 174 enters the portion of the cartridge body 172 that has a greater inside diameter, the annular space between flange 190 of the secondary slide 174 and the inner wall of the cartridge body 172 allows more liquid to pass through the air flow compensator assembly 170. The increased flow of liquid which passes through the air flow compensator assembly 170 pushes against the secondary slide 174 with a sufficient force to overcome the force of secondary spring 175 so that the secondary slide 174 contacts spring stop 176 (which is fixed in position on main slide 173) and holds spring stop 176 and main slide 173 in the position depicted in FIGS. 32 and 33.

It is noted that the air flow compensators disclosed herein could be formed integrally with the flow meters of the present invention or could be adapted to be separate assemblies that can be coupled the various flow meters. For example, the cartridge body depicted in FIGS. 19–33 could form the housings of air flow compensators, and the arm support could be adapted to be coupled to various other flow meter designs. Moreover, the elements of the air flow compensators could be incorporated into the flow meters inlets or outlets.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described herein.

What is claimed is:

1. An air flow compensator which comprises a fluid flow passage having an inlet end and an outlet end; a main slide element having a magnetic insert in one end thereof; a proximity sensor for detecting the proximity of the magnetic insert; a secondary slide element positioned on the main slide element and within a fluid flow passage; a first spring element that biases both the main slide element and the secondary slide element away from the proximity sensor; and a second spring element that biases only the secondary slide element away from the proximity sensor.

2. An air flow compensator according to claim 1, wherein the secondary slide element is both movable with the main slide element and independently movable along the main slide element.

3. An air flow compensator according to claim 2, wherein the first spring element has a spring constant which is smaller than a spring constant of the second spring element.

4. An air flow compensator which comprises:
   a fluid flow passage having an inlet end and an outlet end;
   a proximity sensor positioned adjacent the outlet end of the fluid flow passage;
   a main slide element having a magnetic element in one end, the main slide element moveable between a first position in which the magnetic element is spaced away from the proximity sensor and a second position in which the magnetic element is near the proximity sensor;
   a secondary slide element positioned on the main slide element for movement therewith and for independent movement along the main slide element, the secondary slide element being positioned within the fluid flow passage so as to determine the amount of fluid that can flow therethrough;
   a first spring element that biases the secondary slide toward the inlet end of the fluid flow passage; and
   a second spring element that biases the main slide element toward the inlet end of the fluid flow passage.

5. An air flow compensator according to claim 4, further comprising a spring stop coupled in a fixed manner on the main slide between the first spring element and the second spring element.

6. An air flow compensator according to claim 4, wherein the first spring element has a spring constant which is smaller than a spring constant of the second spring element.

7. An air flow compensator according to claim 4, wherein a portion of the fluid flow passage at the inlet end has an inner diameter that is smaller than a diameter of a portion of the fluid flow passage at the outlet end that has a larger inner diameter.

8. An air flow compensator according to claim 4, wherein secondary slide includes a flange.

9. An air flow compensator according to claim 7, wherein the secondary slide includes a flange, the flange being positioned in the smaller inner diameter portion of the fluid flow passage when the first spring element is compressed and the flange being positioned in the larger inner diameter portion of the fluid flow passage when the first and second spring elements are compressed.

10. An air flow compensator according to claim 8, wherein the inlet end of the fluid flow passage includes abutment projections against which the flange abuts under the biasing forces of the first and second spring elements.

11. An air flow compensator according to claim 9, wherein the inlet end of the fluid flow passage includes abutment projections against which the flange abuts under the biasing forces of the first and second spring elements.

12. An air flow compensator according to claim 4, further comprising a support arm at the outlet end of the fluid flow passage which includes an annular structure that supports an end of the first spring element.

13. An air flow compensator according to claim 12, wherein the support arm further includes inner alignment fins that receive the main slide element therebetween.

14. An air flow compensator according to claim 12, wherein the support arm includes a flange for receiving the proximity sensor therein.

15. An air flow compensator according to claim 4, wherein the proximity sensor comprises a magnetic reed switch.

16. An air flow compensator according to claim 12 in combination with a flow meter.

17. An air flow compensator according to claim 12 in combination with a precalibrated flow meter.

* * * * *